(12) United States Patent
Ban et al.

(10) Patent No.: US 6,775,403 B1
(45) Date of Patent: Aug. 10, 2004

(54) DEVICE FOR AND METHOD OF PROCESSING 3-D SHAPE DATA

(75) Inventors: Shinichi Ban, Kobe (JP); Koji Fujiwara, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/496,428

(22) Filed: Feb. 2, 2000

(30) Foreign Application Priority Data

Feb. 2, 1999 (JP) .......................................... P11-024554
Jun. 7, 1999 (JP) .......................................... P11-159707

(51) Int. Cl.⁷ .............................. G06K 9/00; G06K 9/40
(52) U.S. Cl. ........................ 382/154; 382/118; 382/266
(58) Field of Search ................................ 382/118, 154, 382/266; 345/419; 700/118; 358/464

(56) References Cited

U.S. PATENT DOCUMENTS

| | | | |
|---|---|---|---|
| 5,057,940 A | * 10/1991 | Murakami et al. | 382/243 |
| 5,086,480 A | * 2/1992 | Sexton | 382/171 |
| 5,214,721 A | * 5/1993 | Fukuhara et al. | 382/243 |
| 5,592,567 A | * 1/1997 | Kilger | 382/199 |
| 5,812,695 A | * 9/1998 | Dawe | 382/176 |
| 5,850,463 A | * 12/1998 | Horii | 382/243 |
| 5,905,503 A | 5/1999 | Penna | 345/426 |
| 5,926,574 A | * 7/1999 | Nishikawa et al. | 382/239 |
| 6,424,877 B1 | * 7/2002 | Kondo et al. | 700/117 |

FOREIGN PATENT DOCUMENTS

| | | | |
|---|---|---|---|
| JP | 6-185993 | 7/1994 | |
| JP | 10-277884 | * 10/1998 | B23Q/15/00 |

* cited by examiner

Primary Examiner—Leo Boudreau
Assistant Examiner—Shefali Patel
(74) Attorney, Agent, or Firm—McDermott Will & Emery LLP

(57) ABSTRACT

In a 3-D shape data processing device for producing 3-D shape data from color image data and range image data, a virtual plane is defined at the rear of a range image, and a color image is projected onto the virtual plane. A human figure region rectangle is defined as a rectangle which surrounds a human figure region on the virtual plane, and the range image and the virtual plane are sliced along cutting planes. A line connects an outermost point of measurement and a point at the end of the human figure region rectangle which lie on each of the cutting planes, and a point at the end of the human figure region on the line is defined as a reference point. A region lying between the reference point and the outermost point of measurement is defined as a no-data region, and an additional point is produced in the no-data region. Thus, the device can easily complement the range image data, thereby to easily produce the 3-D shape data based on the range image data.

14 Claims, 19 Drawing Sheets

DB33

DB34

DB34

F I G. 31
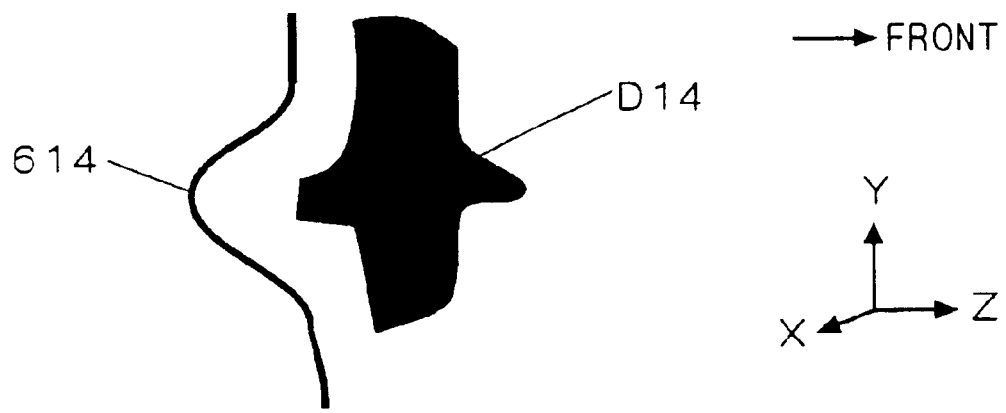
F I G. 32
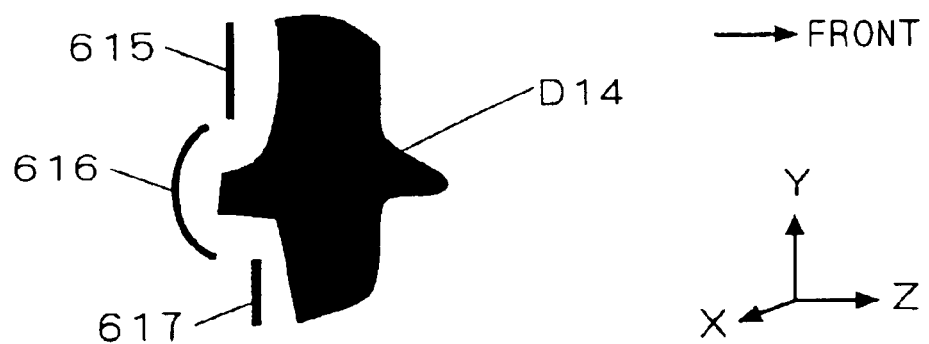

DEVICE FOR AND METHOD OF PROCESSING 3-D SHAPE DATA

This application is based on applications Nos. 11-024554 and 11-159707 filed in Japan, the contents of which are hereby incorporated by reference.

BACKGROUND OF THE INVENTION

1. Field of the Invention

The present invention relates to a device for and method of processing three-dimensional (3-D) shape data for production of a model product of an object in existence.

2. Description of the Background Art

A transportable 3-D noncontact measuring device (so-called 3-D camera) as disclosed in, for example, Japanese Patent Application Laid-Open No. P09-145319A (1997) has already been introduced commercially and is currently being used for data entry into CG (computer graphics) or CAD systems, somatometry and visual recognition of robots. A common noncontact measuring method is a slit light projection method (or a light-section method), but other noncontact measuring methods such as pattern light projection, stereographic projection, and interference fringes are also known.

Currently, 3-D CG software for personal computer use and 3-D machining tools of miniature size for hobby use are commercially available. With such tools, even home users can make model products and creations with ease.

Further, a kind of vending machines that produce small photo stickers of a user's face on the spot have gained great popularity. A user just inserts coins and poses variously for a camera while watching a monitor screen. With predetermined operations, a sheet of several photo stickers is printed out to an access point. Many of the machines offer a selection of photo sizes and superimposed frames.

The above 3-D measuring device can convert the shape of various objects including a human body into data format as easily as taking a photograph. Since noncontact measurement imposes no inconvenience on a subject to be measured even if the subject is a human body, this device can be considered to be used for the production of a 3-D model product of a human face, rather than photo stickers of a human face. The 3-D measuring device in combination with a 3-D machining tool can measure a human face to produce a proper-scale model product thereof on the spot.

Unfortunately, when measuring a human face, the above-mentioned 3-D noncontact measuring device such as a range finder fails to acquire 3-D shape data regarding a region near the facial contour, a low reflectivity region such as black hair and eyebrows, and a lower jaw region which is not exposed by light for measurement, providing incomplete data. In particular, a high probability that data regarding a peripheral region of the human figure is lacking results in the acquirement of 3-D shape data regarding a human figure region smaller than the actual one.

One of the solutions to the above-mentioned problem is a method disclosed in Japanese Patent Application Laid-Open No. P06-185993A (1994). Based on the luminance level near the boundary of the background in a two-dimensional (2-D) image, this method selects 3-D shape data obtained by directing attention toward only the boundary region for a low luminance level region, and selects conventional 3-D shape data obtained using a laser radiating position detection unit for a high luminance level region, thereby providing 3-D shape data regarding a human figure region close to actual.

However, this method must acquire the 3-D shape data that directs attention toward only the boundary region in addition to the conventional 3-D data. This requires special equipment known as a boundary detection unit to produce the 3-D shape data that directs attention toward only the boundary region, leading to accordingly increased device manufacturing costs.

SUMMARY OF THE INVENTION

It is an object of the present invention to provide a device for and method of processing 3-D data which can easily produce 3-D data with a certain degree of precision.

The present invention is intended for a device for processing three-dimensional data, the device outputting desired three-dimensional data about an object based on two-dimensional image data about the object and three-dimensional range image data including range information regarding distances from a reference point for measurement to points of measurement on the object, the two-dimensional image data and the range image data being associated with each other. According to the present invention, the device comprises: means for extracting an object region from a two-dimensional image defined by the two-dimensional image data, based on a predetermined criterion; means for recognizing a no-data region, based on a range image defined by the range image data and the object region; and means for performing a data complementing process by providing data to no-data part of the range image data in the no-data region to produce complemented range image data defining a complemented range image.

In general, the range image defined by the range image data has a disposition to have a peripheral region having no data. Accurately providing data to such a no-data peripheral region requires the correct recognition of the peripheral region. On the other hand, the two-dimensional image defined by the two-dimensional image data does not have such a no-data peripheral region.

In consideration for the dispositions of the range image data and the two-dimensional image data, the device according to the present invention uses the object region obtained from the two-dimensional image data when complementing the range image data, thereby to correctly and easily recognize a region corresponding to the no-data peripheral region of the range image as the no-data region.

Consequently, the device according to the present invention can easily recognize the no-data region with high accuracy to readily provide the three-dimensional data based on the complemented range image data.

According to an another aspect of the present invention, the device comprises: means for discriminating between a preliminary object region and a background region in a two-dimensional image defined by the two-dimensional image data, based on a predetermined criterion; and means for removing a periphery of the preliminary object region to provide an object region.

The present invention can reduce the likelihood that a blurry region is present in the object region.

The present invention is also intended for a method of processing three-dimensional data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 31 illustrates a definition of a virtual curved plane; and

FIG. 32 illustrates a definition of the partial virtual planes including a curved plane.

DESCRIPTION OF THE PREFERRED EMBODIMENTS

<1. Construction of 3-D Model Product Production Apparatus>

Figure 1:
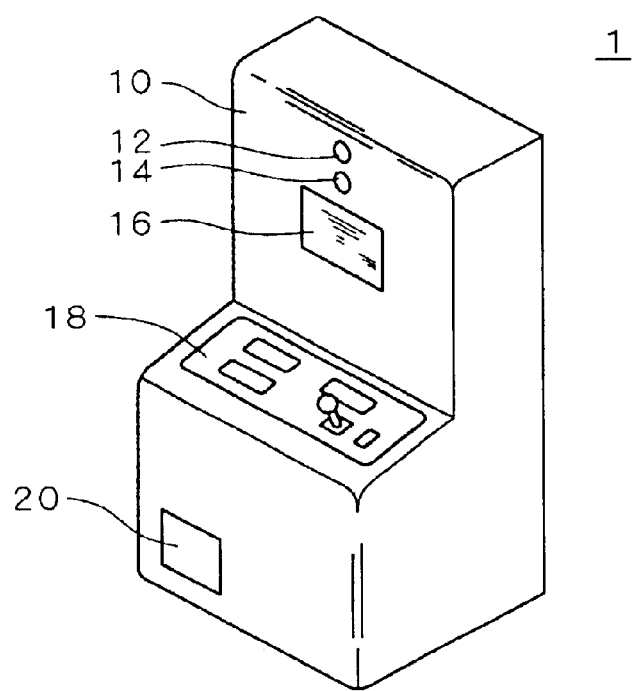
FIG. 1 is an external view of a 3-D model product production apparatus according to a preferred embodiment of the present invention.

FIG. 1 is an external view of a three-dimensional (3-D) model product production apparatus 1 according to a preferred embodiment of the present invention.

The apparatus 1 has the function of measuring the shape of an object and machining a material on the spot based on measured data. The apparatus 1 is used as a vending machine for s mall articles such as relief sculptures of a user's face. An article produced by the apparatus 1 is a 3-D model product with a user's face sculptured in relief on a plate of predetermined shape (e.g., square). An additional relief pattern may be carved on the plate (background). By attaching suitable metal fittings, such an article make an accessory such as a pendant, a brooch, or a key holder. Alternatively, metal fittings may previously be attached to the material.

The upper half of a substantially life-size case 10 has a front face provided with a display 16 for a user to check his or her pose, and a light-transmitting window 12 and a light-receiving window 14 both for optical 3-D measurement. The window 14 is also used for two-dimensional (2-D) color image capture. The lower half of the case 10 juts forward from the upper half, and has an upper surface provided with a control panel 18. An access point 20 for outputting products is provided in the front face of the lower half.

Figure 2:
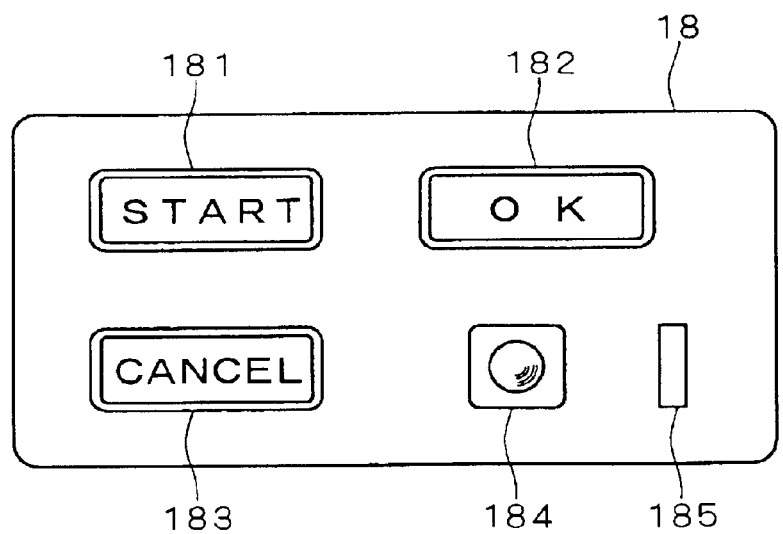
FIG. 2 is a plan view of a control panel.

FIG. 2 is a plan view of the control panel 18.

The control panel 18 is provided with a start button 181, an OK button 182, a cancel button 183, a joystick 184, and a coin slot 185. The start button 181 is starting means and the OK button 182 is confirmation means. The joystick 184 is used to command model's composition to be changed. More specifically, a 3-D shape model is rotated in response to a panning action by moving the joystick 184 to the right and left, a tilting action by moving the joystick 184 up and down, and a rolling action by rotating a knob, the results of which are displayed one after another. The cancel button 183 is manipulating means for commanding remeasurement to be made when the user does not like the displayed 3-D shape model. There is a limit on the number of times the user can use the cancel button 183 to command the remeasurement to be made.

Figure 3:
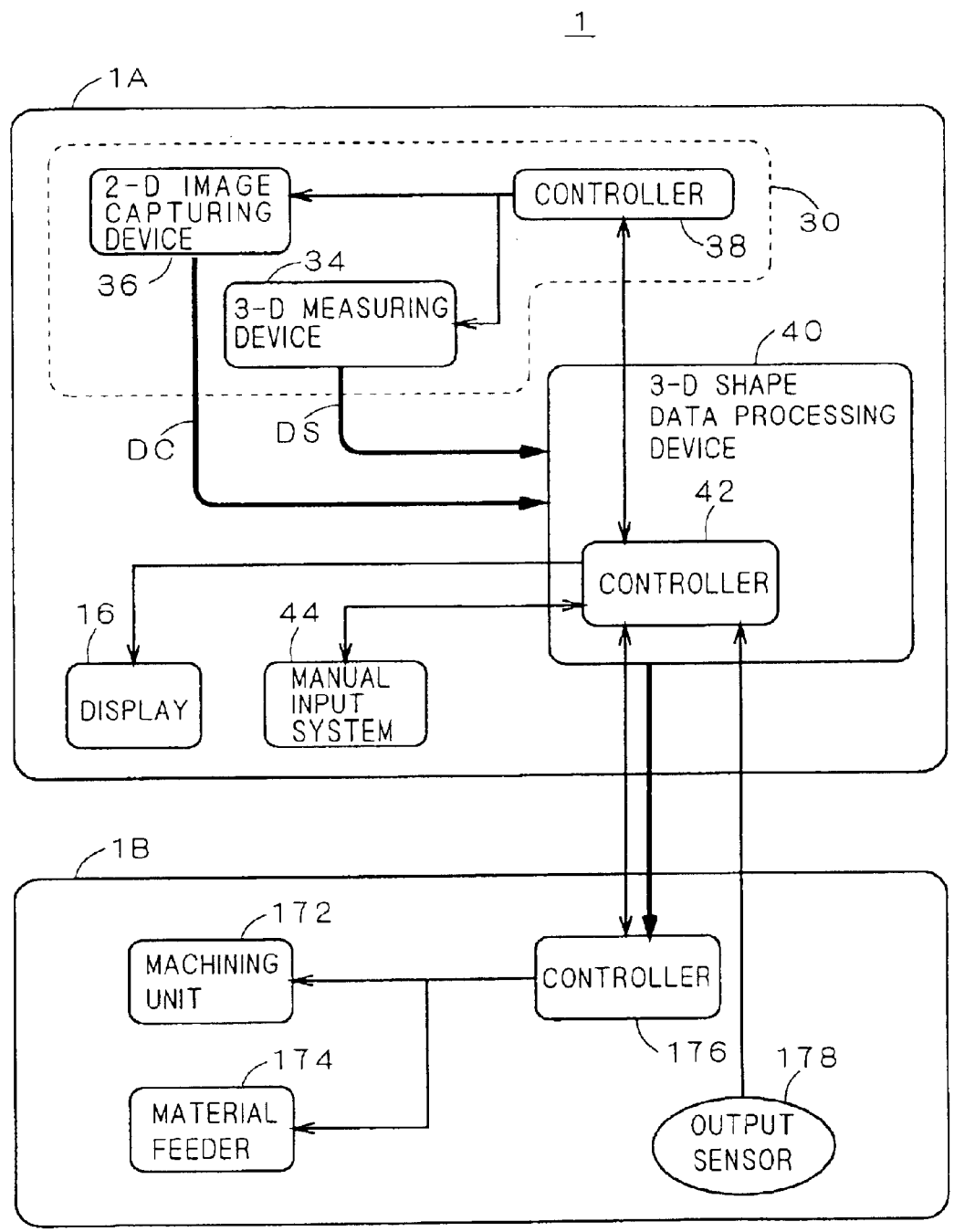
FIG. 3 is a functional block diagram of the 3-D model product production apparatus.

FIG. 3 is a functional block diagram of the 3-D model product production apparatus 1.

The apparatus 1 comprises a modeling system 1A for producing a 3-D shape model of miniature size and a machining system 1B for producing a 3-D model product based on the 3-D shape model.

The modeling system 1A includes an image capturing system 30 for converting information on the appearance of a user as an original object into digital data. The image capturing system 30 includes a 3-D measuring device 34 for converting shape information into 3-D range image data (so-called 3-D image data) DS by means of slit light projection, a 2-D image capturing device 36 for converting color information into 2-D color image data DC, and a controller 38.

The range image data DS is given in terms of X, Y and Z coordinates in a Cartesian coordinate system, and provides range information on the object, i.e., a distance from a reference point of measurement in the measuring device 34 to the point of measurement of the object. The range image data DS also includes effective flag information indicating whether or not measured data on reflected light from the object is obtained.

The color image data DC, on the other hand, includes three primary colors, R (red), G (green) and B (blue) of each pixel. When the image capturing system 30 is configured, for example, using a 3-D camera as disclosed in Japanese Patent Application Laid-Open No. P09-145319A, the range image data DS and the color image data DC may be quite easily associated with each other since 3-D measurement and 2-D image capturing are performed from the same viewpoint. The color image data DC is 400- by 400- pixel data, whereas the range image data DS is 200- by 200- pixel data.

Even if the 3-D measurement and the 2-D image capturing are performed from different viewpoints, the range image data DS and the color image data DC may be associated with each other without a hitch since each data DS, DC includes viewpoint information and relative relation between coordinates and results of the 3-D measurement and the 2-D image capturing is known. The range image data DS and the color image data DC as above described are inputted to a 3-D shape data processing device 40 which will be described later.

Instead of the slit light projection, other methods may be used for 3-D measurement.

The 3-D shape data processing device 40 comprises an image processing circuit not shown, and performs various types of data processing including data correction typical of the present invention. The 3-D shape data processing device 40 is a feature of this embodiment. A controller 42 of the 3-D shape data processing device 40 exercises total control over the apparatus 1, and provides appropriate instructions to the controller 38 of the image capturing system 30 and a controller 176 of the machining system 1B. The display 16 and a manual input system 44 are connected to this controller 42. The manual input system 44 includes the aforementioned control panel 18 and a money receiving mechanism.

The machining system 1B includes a machining unit 172 for machining a material such as a resin block, a material feeder 174 for supplying the material to a work position and conveying a finished product to the access point 20, the controller 176, and an output sensor 178. A signal detected by the sensor 178 is inputted to the controller 42.

Alternatively, the image capturing system 30 and the machining system 1B may be controlled by the controller 42, with the controllers 38 and 176 dispensed with.

<2. General Operation of 3-D Model Product Production Apparatus>

Figure 4:
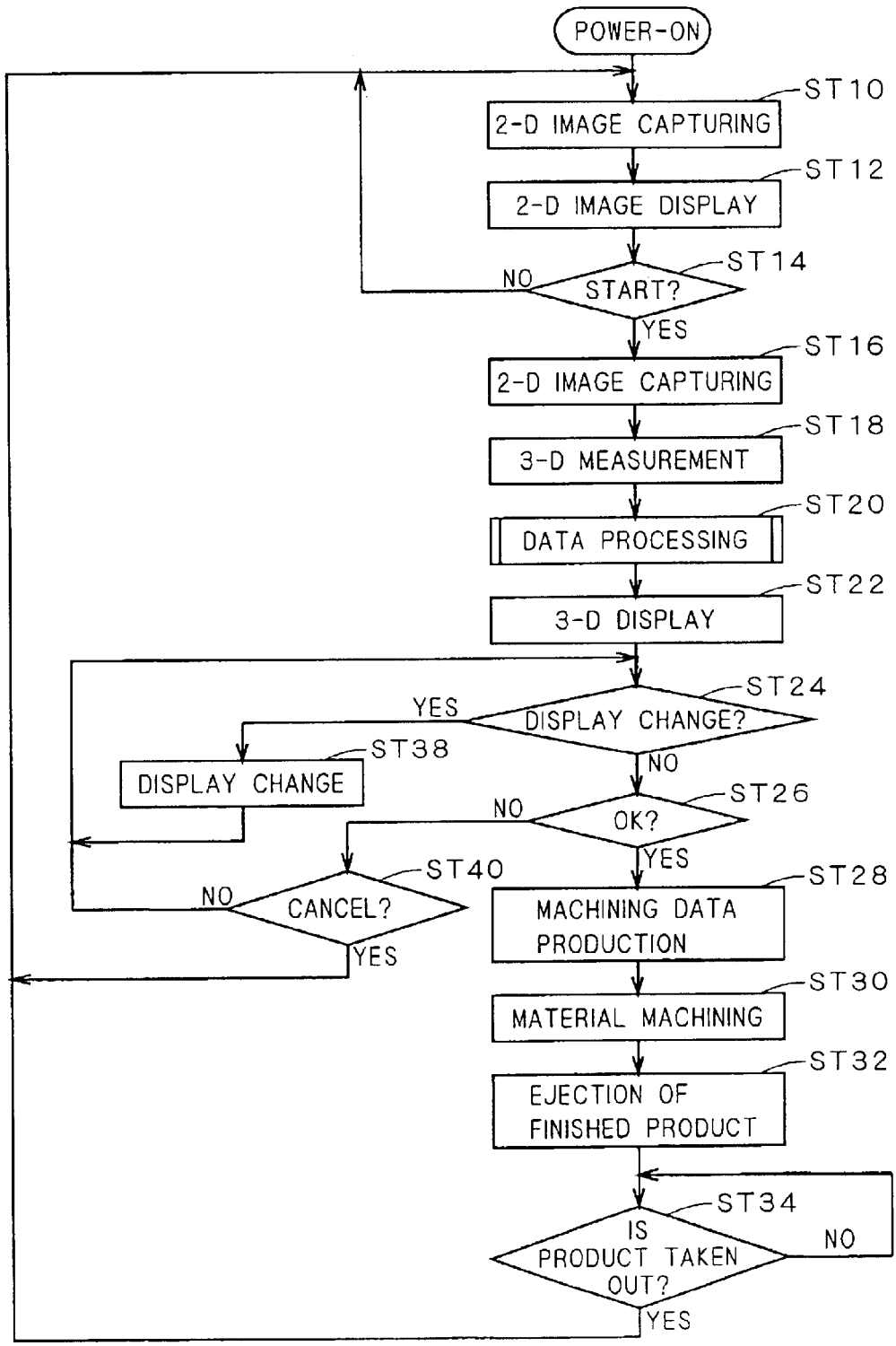
FIG. 4 is a flowchart showing the general operation of the 3-D model product production apparatus.

FIG. 4 is a flowchart showing a general operation of the 3-D model product production apparatus 1. Referring now to FIG. 4, a procedure of the general operation of the apparatus 1 will be described.

After power is turned on, the apparatus 1 repeats 2-D image capturing and display of a captured image during standby for user operation (Steps ST10, ST12, ST14). A guide message is displayed at regular time intervals. With the insertion of coins and the push of the start button 181, the apparatus 1 recaptures an 2-D image and performs 3-D measurement (Steps ST16, ST18). The apparatus 1 performs predetermined data processing (Step ST20) to display a resultant 3-D shape model (Step ST22). For display, a known graphics technique such as shading is used to enhance the appearance of the model. Then, the apparatus 1 waits for user's instruction. Here a finite limit is placed on the waiting time, and after the expiration of the time limit, the apparatus 1 assumes that a confirmation operation is performed.

The 3-D shape model on display is, as previously described, rotated in response to the manipulation of the joystick 184 (Steps ST24, ST38). With the push of the cancel button 183, the apparatus 1 returns to its standby operation (Steps ST40, ST10), but a user can start remeasurement only by pressing the start button 181 without the need to insert another coin.

With the push of the OK button 182 (Step ST26), the apparatus 1 produces machining control data with reference to a machining condition database, based on the 3-D shape model (Step ST28), and machines a material (Step ST30). After the completion of the machining, the apparatus 1 ejects a finished product (Step ST32) and returns to its standby operation upon confirming, by the sensor 178, that the product is taken out (Steps ST34, ST10).

<3. Face Modeling>

Figure 5:
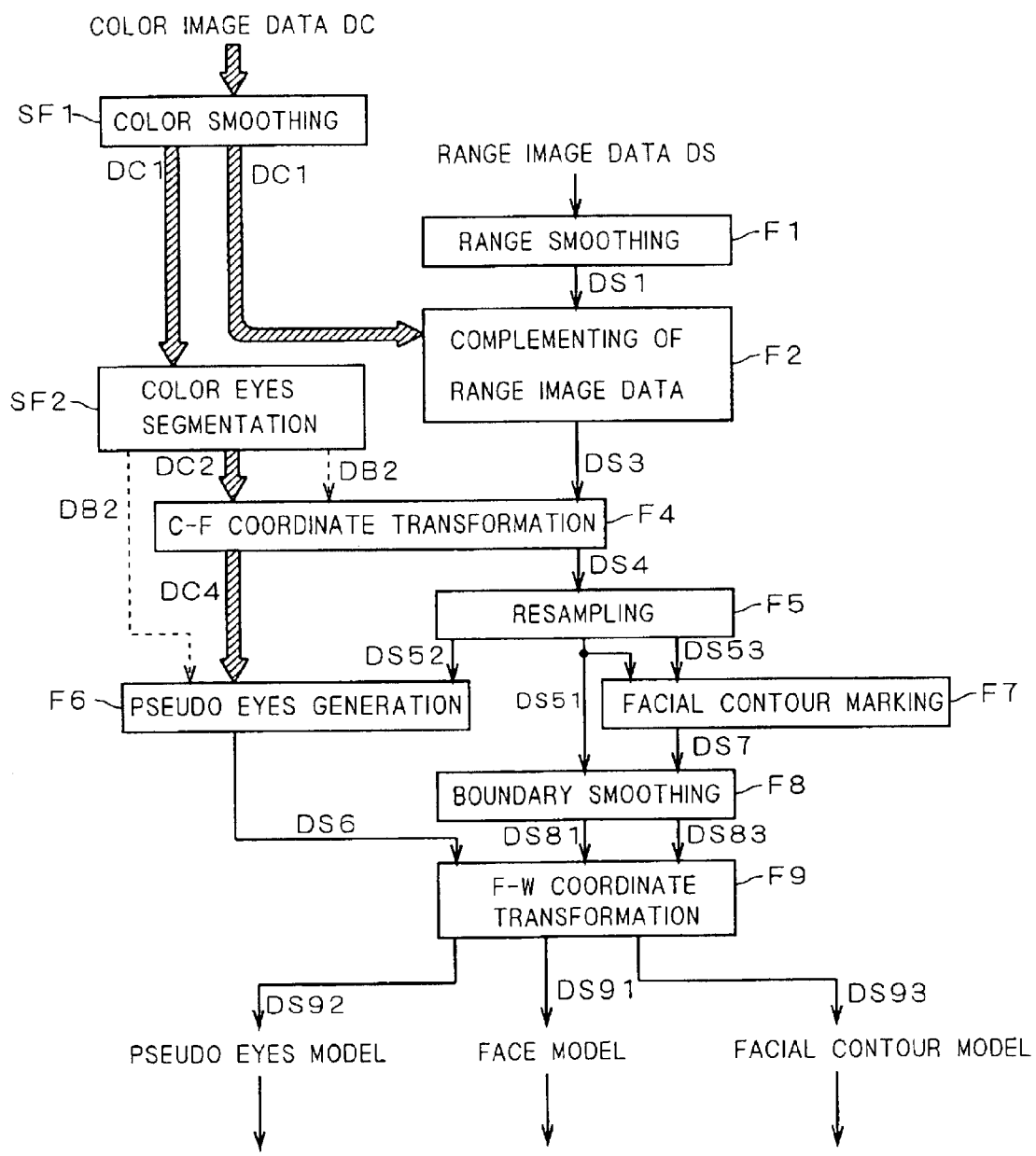
FIG. 5 is a data flow diagram in 3-D shape data processing.

FIG. 5 is a data flow diagram showing flows of data in the data processing of Step ST20 shown in FIG. 4. In FIG. 5, the bold hatch arrows indicate flows of data based on the color image data DC, the solid arrows indicate flows of data based on the range image data DS, and the broken arrow indicates a flow of binary image data.

The reference characters F1, F2, F4–F9, SF1, and SF2 denote data processing functions of the 3-D shape data processing device 40 shown in FIG. 3 for production of 3-D processed shape data. In particular, the functions SF1 and SF2 correspond to functions of producing shape data regarding an eyes model in the face which is included in the 3-D processed shape data. The functions SF1, F1, F2, SF2, F4–F9 will now be described in the order named. It should be noted that the function F2 is a feature of the present invention.

<3.1 Color Smoothing Function SF1>

Color smoothing function SF1 removes noise from the raw color image data DC outputted from the 2-D image capturing device 36 shown in FIG. 3 to produce noise-free color image data DC1.

<3.2 Range Data Smoothing Function F1>

Range data smoothing function F1 removes noise from the range image data DS which is raw 3-D shape data outputted from the 3-D measuring device 34 shown in FIG. 3 to produce noise-free range image data DS1.

<3.3 Range Image Data Complementing Function F2>

Range image data complementing function F2 produces range image data DS3 complemented by providing data to a no-data pixel region, based on the noise-free range image data DS1 produced by the range data smoothing function F1 and the noise-free color image data DC1 produced by the color smoothing function SF1. The range image data complementing function F2 will be described later in detail.

<3.4 Color Eyes Segmentation Function SF2>

Color eyes segmentation function SF2 produces eye-region binary image data DB2 that defines eye regions in the color image data DC1, based on the noise-free color image data DC1 produced by the color smoothing function SF1. The color image data DC1 is also outputted directly as color image data DC2.

<3.5 C-F (Camera-to-Face) Coordinate Transformation Function F4>

C-F coordinate transformation function F4 transforms the coordinates of the range image data DS3 so that the orientation of the face shape determined with respect to the eye regions is in a face-to-face relationship with a camera, based on the range image data DS3 complemented by the range image data complementing function F2 and the eye-region binary image data DB2 produced by the color eyes segmentation function SF2, thereby to produce range image data DS4.

In other words, the range image data DS3 represented in a camera-centered coordinate system is converted into the range image data DS4 represented in a face-centered coordinate system. The color image data DC2 is outputted directly as color image data DC4.

<3.6 Resampling Function F5>

Resampling function F5 performs a coordinate transformation such as resampling or averaging on the range image data DS4 which is subjected to the C-F coordinate transformation by the C-F coordinate transformation function F4. The range image data DS4 that originates from the range image data DS obtained through perspective projection transformation by the 3-D measuring device 34 is composed of irregularly arranged pixels. Resampling is to convert the range image data DS4 by projection transformation into range image data with pixels equally spaced when viewed from a new viewpoint.

Resampling by the resampling function F5 converts the range image data DS4 into three types of range image data: first shape data DS51 indicative of a human face model, second shape data DS52 for generating a pseudo eyes model, and third shape data DS53 for generating a facial contour model.

For sculpturing a human figure in relief on a thick plate such as a medal, the range image data is compressed in an image capturing direction (i.e., in a direction toward the apparatus 1) in any stage after the resampling. This provides range image data that defines a 3-D shape model product in relief.

<3.7 Pseudo Eyes Generation Function F6>

Pseudo eyes generation function F6 processes the second shape data DS52 into pseudo eyes shape data DS6 so as to give the eye regions in the second shape data DS52 a depth dimension (i.e., depth of machining), based on the color image data DC4 through the C-F coordinate transformation function F4, the eye-region binary image data DB2 produced by the color eyes segmentation function SF2, and the second shape data DS52 about the pseudo eyes model resampled by the resampling function F5.

<3.8 Facial Contour Marking Function F7>

Facial contour marking function F7 deletes overlap data (i.e., differentiation) between the first shape data DS51 indicative of the face model and the third shape data DS53 for producing the facial contour model, which are resampled by the resampling function F5, to produce facial contour shape data DS7.

<3.9 Boundary Smoothing Function F8>

Boundary smoothing function F8 performs boundary smoothing on the facial contour shape data DS7 produced by the facial contour marking function F7 and the first shape data DS51 resampled by the resampling function F5. This is because considerable changes in range image data in inclined portions of the facial contour tend to cause variations in machining position when producing such an inclined surface of the face model product. For this reason, the data DS51 and the data DS7 are modified into first shape data DS81 and facial contour shape data DS83, respectively, so that machining positions of the inclined surface become smooth even if the face model product is viewed sideways.

<3.10 F-W (Face-to-Work) Coordinate Transformation Function F9>

F-W coordinate transformation function F9 performs a coordinate transformation on the first shape data DS81 and the facial contour shape data DS83 which are boundary-smoothed by the boundary smoothing function F8, and the pseudo eyes shape data DS6 produced by the pseudo eyes generation function F6 so as to conform to the size of a workpiece to be machined into the face model product.

This transformation finally provides face shape data DS91 indicative of a face model, pseudo eyes shape data DS92 indicative of a pseudo eyes model, and facial contour shape data DS93 indicative of a facial contour model. A combination of the data DS91, DS92, DS93 serve as the 3-D processed shape data.

<4. Details of Range Image Data Complementing Function F2>

<4.1 Overview>

Figure 6:
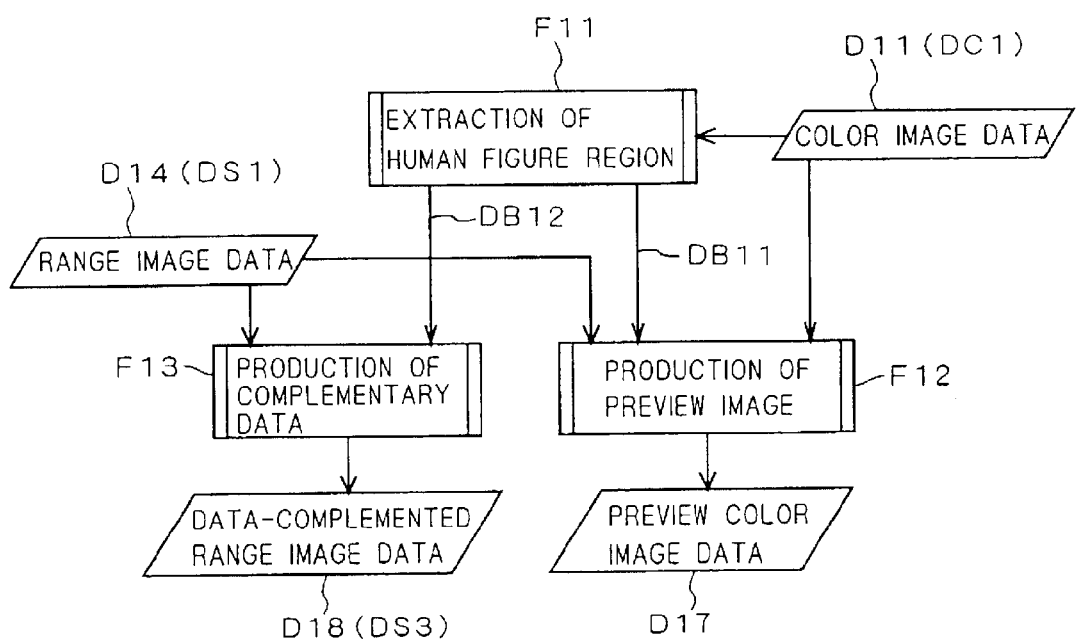
FIG. 6 is a functional block diagram of a range image data complementing function.

FIG. 6 is a functional block diagram showing an overview of the range image data complementing function F2 of FIG. 5. Operations of a plurality of functions shown in the functional block diagram of FIG. 6 correspond to the operating steps of the 3-D shape data processing device 40, respectively, and a data flow in the functional block diagram of FIG. 6 indicates the chronological order in which the operations of the plurality of functions are executed. The same considerations shall apply to other functional block diagrams.

As shown in FIG. 6, a function F11 extracts a human figure region (a region including a human face and an upper part of a human body) from color image data D11 (corresponding to the color image data DC1 of FIG. 5) to finally provide background binary image data DB11 and human figure binary image data DB12.

A function F12 is a preview image producing function of providing preview color image data D17, based on the background binary image data DB11 provided by the function F11, the color image data D11 and range image data D14 (corresponding to the range image data DS1 of FIG. 5).

The operation of a function F13 is performed in parallel with the operation of the function F12. The function F13 is a complementary data producing function of processing the range image data D14 using the human figure binary image data DB12 provided by the function F11 to finally produce data-complemented range image data D18 (corresponding to the range image data DS3 of FIG. 5).

<4.2 Details of Human Figure Region Extracting Function F 11>

Figure 7:
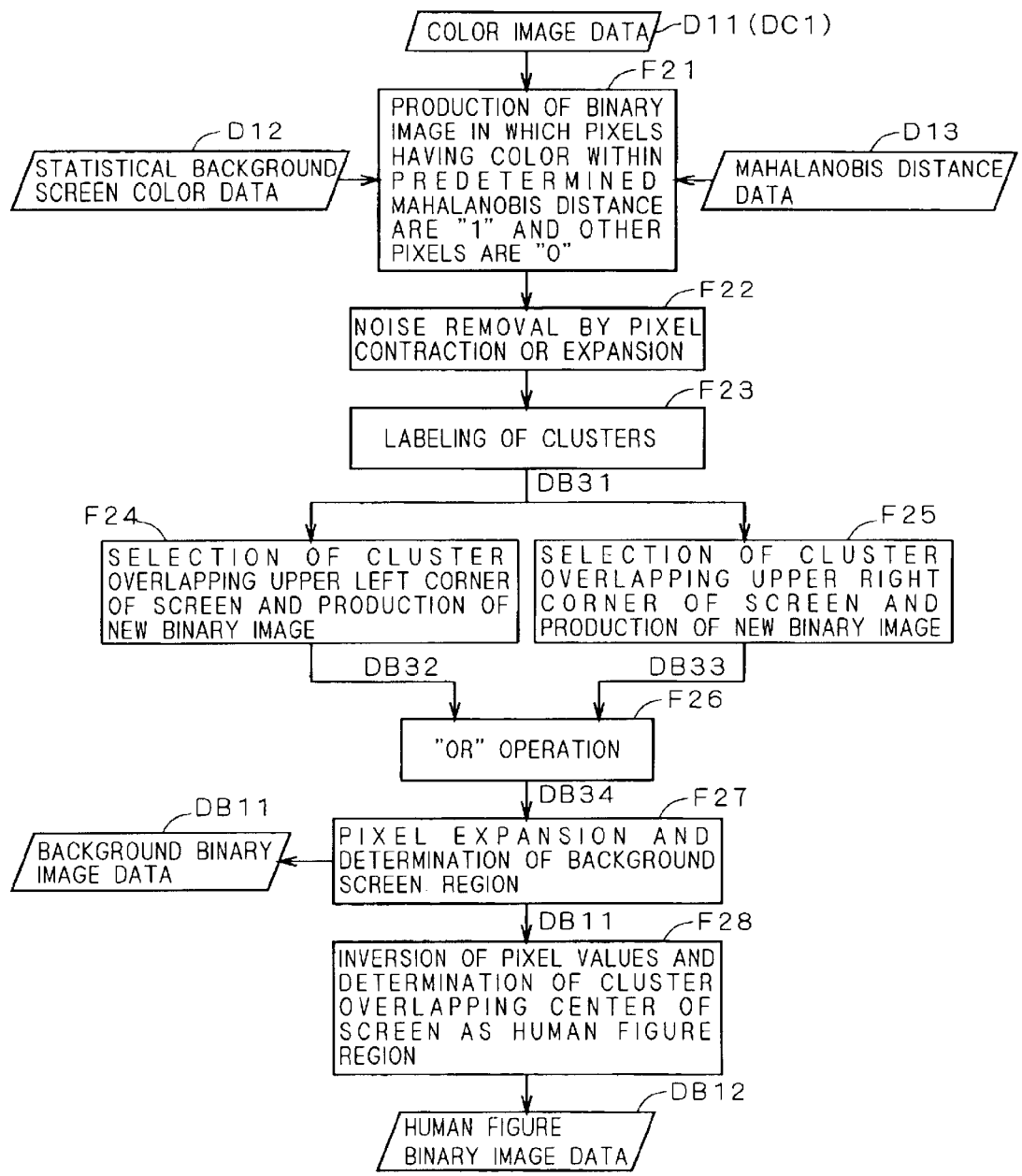
FIG. 7 is a functional block diagram of a human figure region extracting function shown in FIG. 6.

FIG. 7 is a functional block diagram showing a plurality of functions constituting the human figure region extracting function F11 of FIG. 6 together with data flows.

With reference to FIG. 7, a function F21 receives the color image data D11 (corresponding to the color image data DC1 of FIG. 5), statistical data D12 regarding colors of a background screen (background curtain) and Mahalanobis distance data D13. The statistical background screen color data D12 contains the average value of colors of the background screen, an inverse covariance matrix and the like. The Mahalanobis distance data D13 indicates a range of colors for use in judging pixels to be in a background screen region in a color distribution space (i.e., an RGB space). The statistical background screen color data D12 and the Mahalanobis distance data D13 are previously set as data in a human figure region defining file.

The function F21 judges whether or not the values of R, G and B of each pixel read from the color image data D11 fall within a range defined by a Mahalanobis distance of the background screen color with reference to the statistical background screen color data D12 and the Mahalanobis distance data D13, to produce a binary image in which pixels (precisely, pixel values) falling within the range are "1" (white) and other pixels are "0" (black).

Next, a function F22 contracts or expands the white pixels in the binary image produced by the function F21 to remove white noise components from the binary image.

A function F23 labels each cluster, i.e. a group of white pixels separated from the others by black pixels, in a noise-free binary image provided by the function F22, to produce cluster-labeled binary image data DB31.

Figure 8:
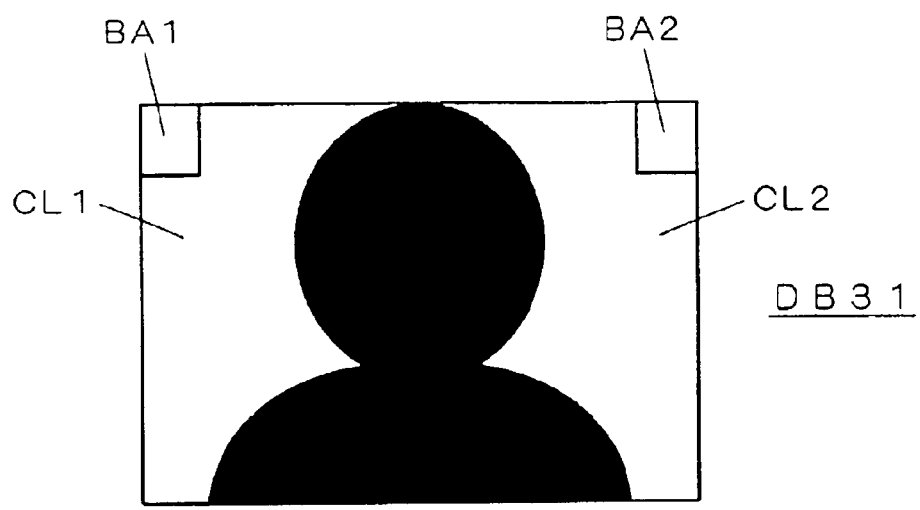
FIGS. 8 through 15 are views for illustrating a human figure region extracting process.

FIG. 8 is a view illustrating an example of the binary image data DB31. As illustrated in FIG. 8, the labeling provides two background screen clusters CL1 and CL2. A black region between the background screen clusters CL1 and CL2 serves as a preliminary human figure region. Background screen judgement regions BA1 and BA2 are established in imaginary fashion in the upper left and right corners of the screen, respectively. Subsequent functions F24 to F28 will be described using an example of processing of the binary image data DB31 shown in FIG. 8.

Figure 9:
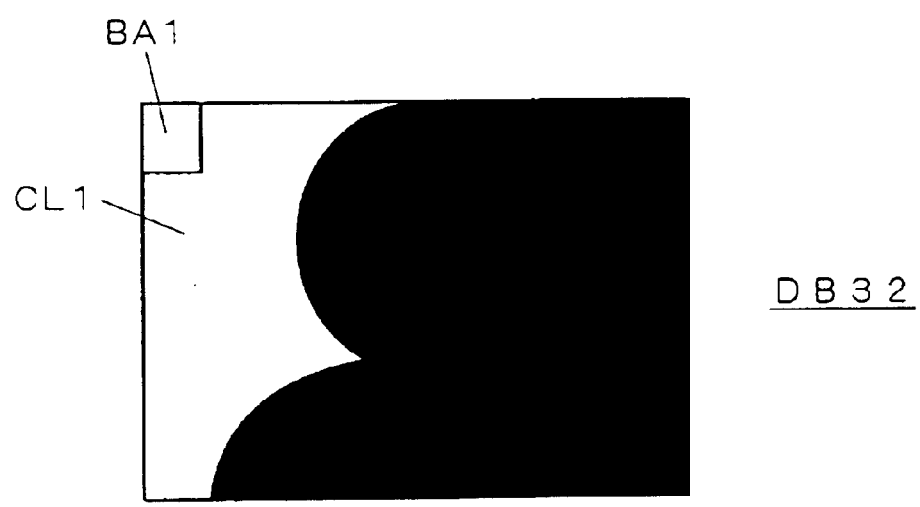

The function F24 selects a background screen cluster which overlaps one of the background screen judgement regions which is established in the upper left corner in the binary image data DB31 to produce binary image data DB32 in which other regions (precisely, pixel values in the regions) than the selected background screen cluster are all "0." This processes the binary image data DB31 into the binary image data DB32 in which other regions than the background screen cluster CL1 overlapping the background screen judgement region BA1 are all "0," as shown in FIG. 9.

Figure 10:
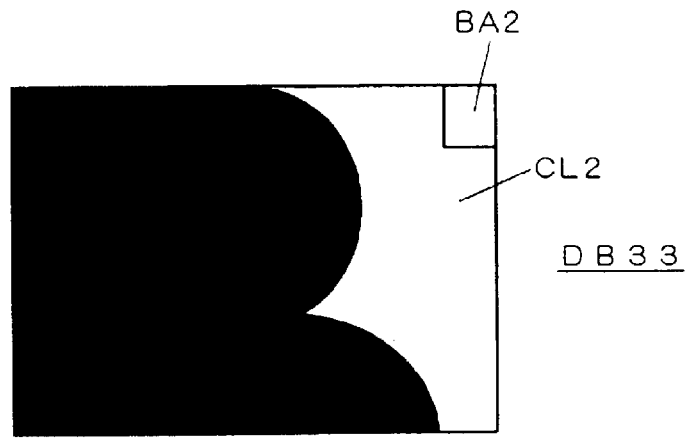

In parallel with the operation of the function F24, the function F25 selects a background screen cluster which overlaps one of the background screen judgement regions which is established in the upper right corner in the binary image data DB31 to produce binary image data DB33 in which other regions than the selected background screen cluster are all "0." This processes the binary image data DB31 into the binary image data DB33 in which other regions than the background screen cluster CL2 overlapping the background screen judgement region BA2 are all "0," as shown in FIG. 10.

Figure 11:

The function F26 performs the OR operation on corresponding pixels of the binary image data DB32 and DB33 to produce binary image data DB34. This processes the binary image data DB32 and DB33 into the binary image data DB34 shown in FIG. 11. Consequently, pixels in other than the background screen clusters CL1 and CL2 are forced to be "0" (black). Thus, if a noise component, or a white component, is present in the preliminary human figure region other than the background screen clusters in the stage of the binary image data DB31, the noise component is reliably removed in the stage of the binary image data DB34.

Figure 12:
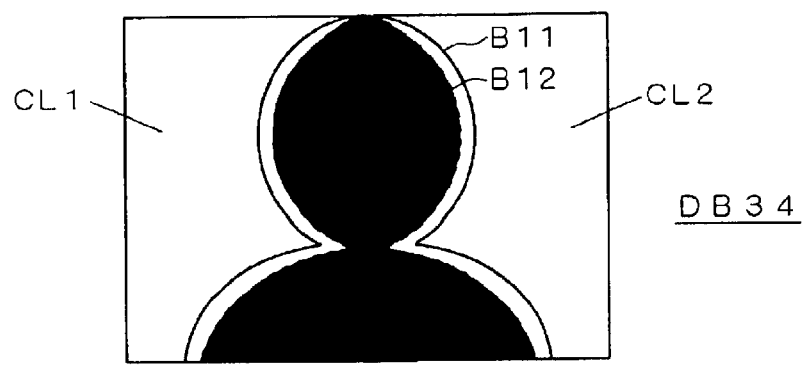
Figure 13:
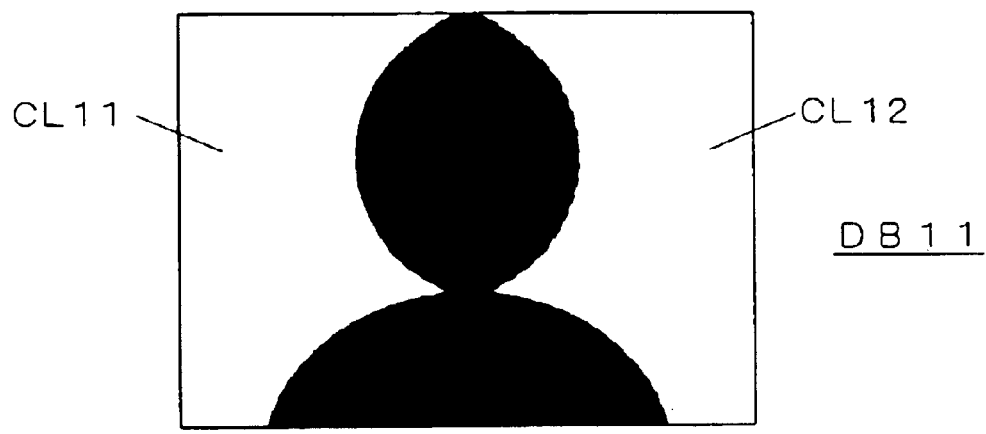

The function F27 performs pixel expansion for white components. This provides the background binary image data DB11 in which white components indicate a background region. Referring to FIG. 12, the function F27 moves the boundary between the background region and the human figure region in the binary image data DB34 from a line B11 to a line B12 as shown in FIG. 12, thereby to provide the background binary image data DB11 containing the background region comprised of background screen clusters CL11 and CL12 resulting from the expansion of the background screen clusters CL1 and CL2, as shown in FIG. 13. In other words, pixel-by-pixel removal of the periphery of the preliminary human figure region that is the black region of FIG. 12 provides the human figure region that is the black region of FIG. 13.

Figure 14:
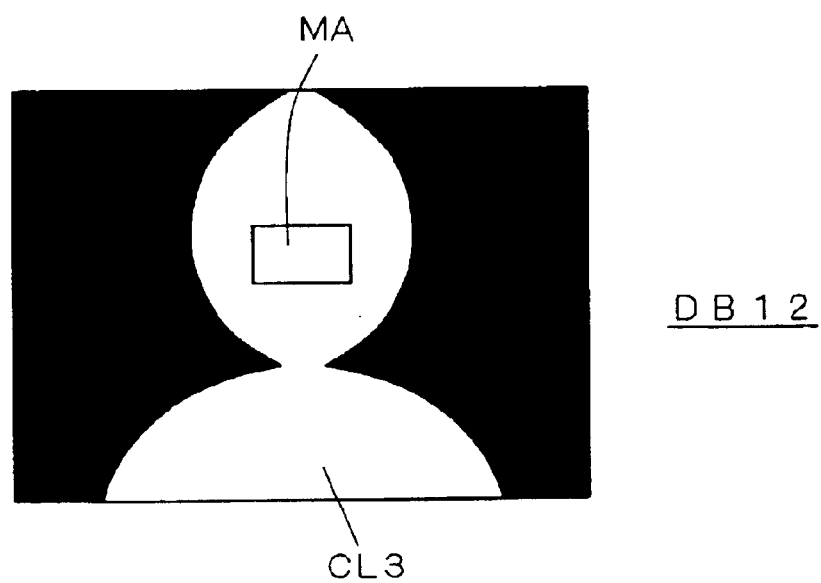

Next, the function F28 inverts the pixel values "1" and "0" in the background binary image data DB11, and thereafter labels new clusters. Then, the function F28 sets other regions than a human figure cluster which overlaps a human figure judgement region MA in the center of the screen at "0," to provide the human figure binary image data DB12, as shown in FIG. 14. This processes the background binary image data DB11 into the human figure binary image data DB12. Consequently, pixels in other than the human figure cluster CL3 are forced to be "0" (black). Thus, if a noise component (a black component in the stage of the background binary image data DB11) is present in the background region other than the human figure cluster in the stage of the background binary image data DB1, the noise component is reliably removed in the stage of the human figure binary image data DB12.

Further, the pixel-by-pixel removal of the periphery of the preliminary human figure region by the pixel expansion of the background region for provision of the human figure region by the function F27 reliably eliminates a phenomenon in which a background color present near the human figure contour causes a blur in the color image defined by the color image data D11.

Figure 15:
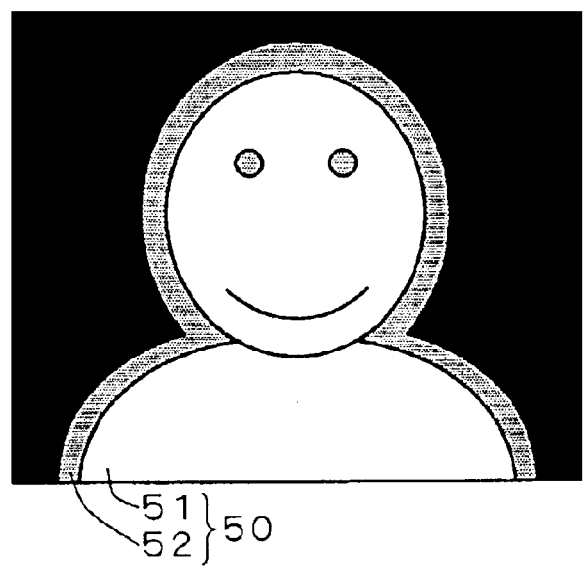
Figure 16:
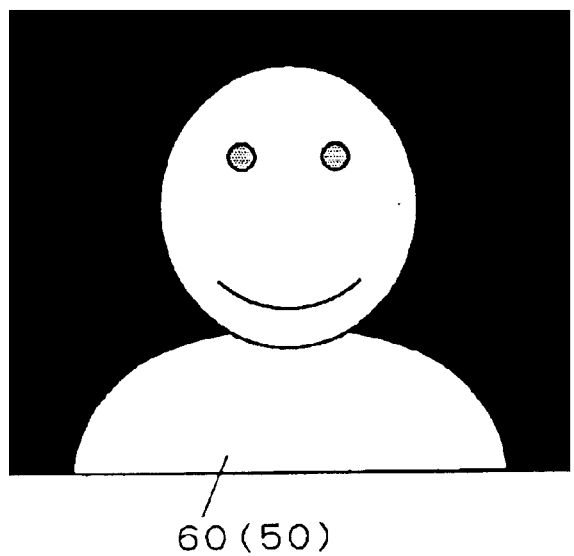
FIG. 16 shows an image for illustrating the effect of the human figure region extracting process.

Without the expansion by the function F27, a human figure region 50 determined by the human figure binary image data DB12 has a proper human figure region 51 and a blurry region 52 in which the background color is present around the contour, as shown in FIG. 15. As a result, the color image of the human figure defined by the human figure binary image data DB12 becomes an unsharp image. On the other hand, if the expansion is performed by the function F27, there is a high probability that the human figure region 50 is substantially comprised of only a proper human figure region 60, as shown in FIG. 16. As a result, the color image of the human figure defined by the human figure binary image data DB12 becomes a sharp image in which the background color is absent. In other words, the human figure binary image data DB12 defines the region of the human figure substantially properly.

Figure 17:
FIGS. 17 and 18 show actual images for illustrating the effect of the human figure region extracting process.
Figure 18:

FIGS. 17 and 18 show actual image examples produced without and with the expansion, respectively, for reference purposes. A comparison between the images of FIGS. 17 and 18 show that a blur near the human figure region contour (particularly near the shoulders) is eliminated in the image shown in FIG. 18.

Figure 19:
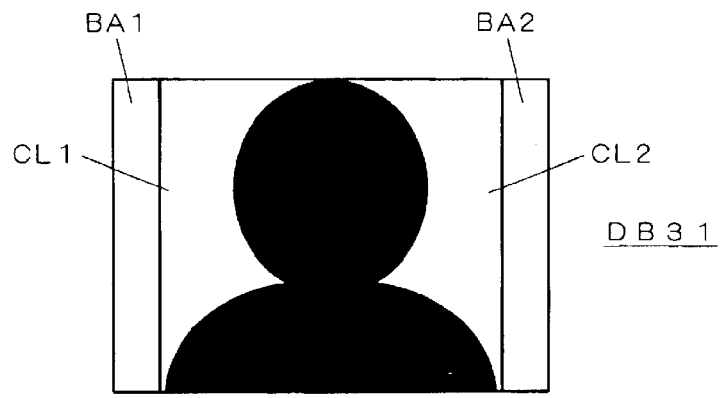
FIG. 19 illustrates a variation of a background screen judgement region.

Although the background screen judgement regions BA1 and BA2 are established in the upper left and right corners of the image respectively in the instance of FIG. 8, any background screen judgement region may be established so long as the clusters corresponding to the background are precisely extracted. For instance, regions extending vertically along the left and right sides of the image may be used as the background screen judgement regions BA1 and BA2, respectively, as shown in FIG. 19. This allows precise extraction of the background region even if an object other than the background covers the upper left or right corner.

<4.3 Details of Preview Image Producing Function F12>

Figure 20:
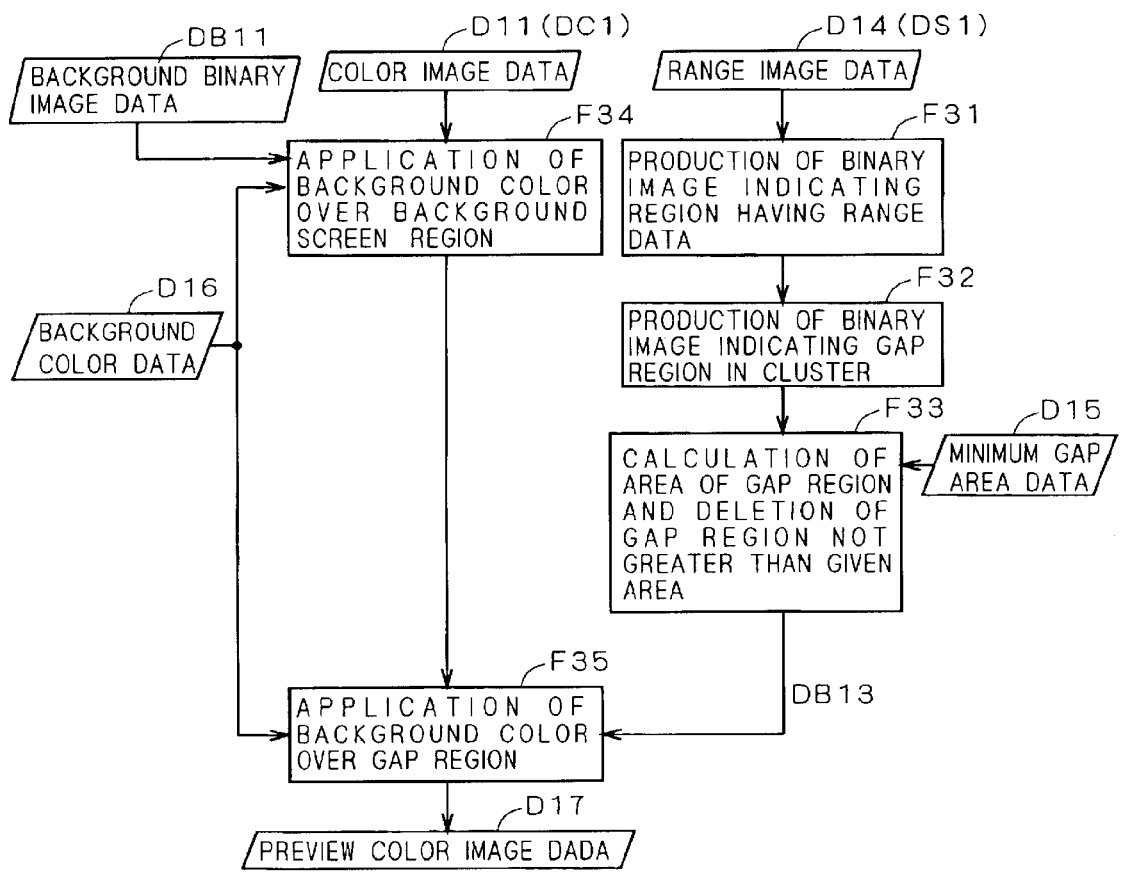
FIG. 20 is a functional block diagram of a preview image producing function shown in FIG. 6.

FIG. 20 is a functional block diagram showing a plurality of functions constituting the preview image producing function F12 together with data flows.

A function F31 receives the range image data D14 (corresponding to the range image data DS1 of FIG. 5), and produces a 2-D binary image data in which pixels having range data contained in the range image data D14 are "1" (white).

A function F32 produces gap region binary image data from the binary image data produced by the function F31. The gap region binary image data indicates black gap regions in the clusters of white pixels.

A function F33 receives the gap region binary image data produced by the function F32 and externally supplied minimum gap area data D15. The function F33 calculates the area of each gap region to delete (or change to white) gap regions having an area not greater than a lower limit defined by the minimum gap area data D15 among the gap regions provided from the gap region binary image data, thereby producing gap region binary image data DB13 in which only gap regions having an area greater than the lower limit are left.

The operation of a function F34 is performed in parallel with the operations of the functions F31 to F33. The function F34 receives the color image data D11 (corresponding to the color image data DC1 of FIG. 5), the background binary image data DB11 and background color data D16 from the exterior, and applies a background color defined by the background color data D16 over a region which is included in the color image defined by the color image data D11 and which corresponds to the background region of the image defined by the background binary image data DB11, thereby to process the color image data D11.

A function F35 receives the gap region binary image data DB13 produced by the function F33, the color image data D11 processed by the function F34 and the externally supplied background color data D16. The function F35 applies the background color defined by the background color data D16 over regions which are included in the color image defined by the color image data D11 processed by the function F34 and which correspond to the gap regions of the image defined by the gap region binary image data DB13, to further process the color image data D11, thereby producing the preview color image data D17.

Figure 21A:
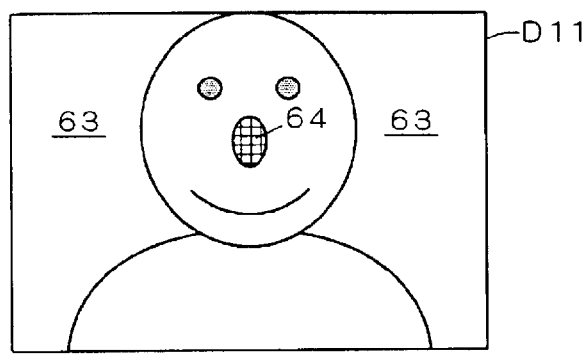
FIGS. 21A, 21B, 21C and 22 are views for illustrating a preview image producing process.
Figure 21B:
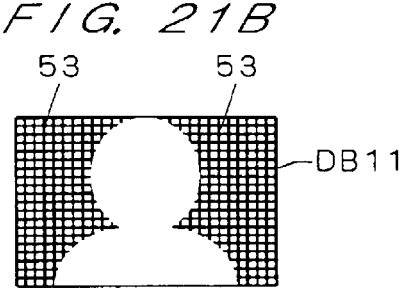
Figure 21C:
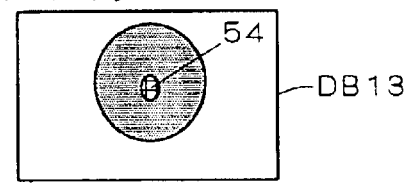

FIGS. 21A, 21B, 21C and 22 are views for illustrating the processing of the functions F34 and F35. Referring to FIGS. 21A to 21C, a region 63 of the image of FIG. 21A defined by the color image data D11 corresponds to a background region 53 of the image of FIG. 21B defined by the background binary image data DB11, and a region 64 of the image of FIG. 21A corresponds to a gap region 54 of the image of FIG. 21C defined by the gap region binary image data DB13.

Figure 22:
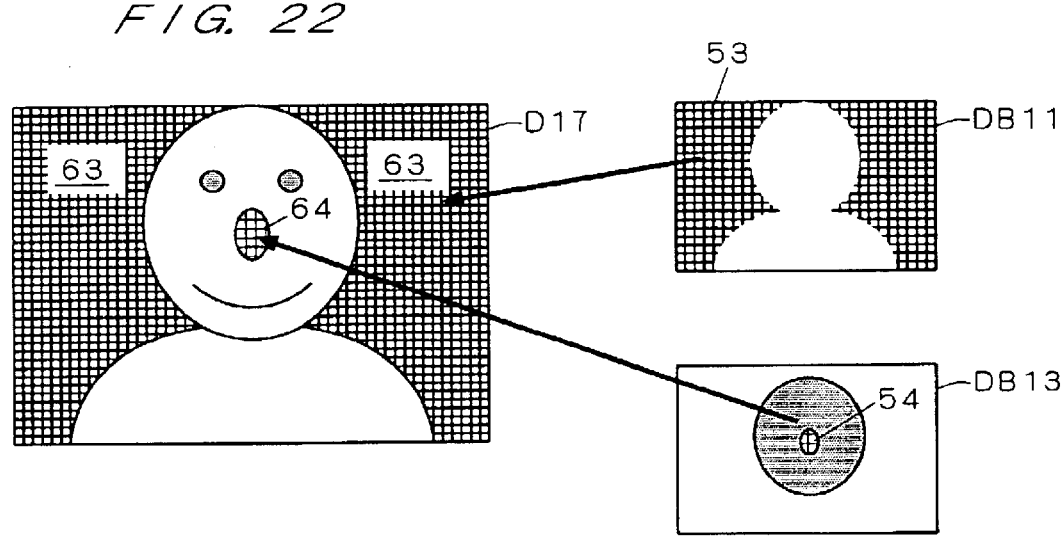

Thus, the preview color image data D17 is color image data in which the background color defined by the background color data D16 is applied over the regions 63 and 64, as shown in FIG. 22.

It should be noted that the region 64 is an error region, and the color application over the error region is intended to ensure user's recognition of the presence of the error region when the preview image is displayed based on the preview color image data D17. Therefore, other than the background color may be applied over the region 64 so long as the applied color is conspicuous when the image defined by the preview color image data D17 is displayed. For example, a color similar to those of hair and eyeballs may be applied over the region 64.

The gap regions may be classified and color-coded. The 3-D measurement technique based on the detection of reflected slit light as in this preferred embodiment is incapable of measuring black parts such as eyes and eyebrows at which the reflected slit light is not detected to induce gap regions (referred to hereinafter as gap regions of a first type). Further, this measuring device 34 is generally incapable of making measurements outside a predetermined range. A projecting part such as the tip of the nose sometimes falls outside the predetermined range, in which case the tip of the nose becomes a gap region (referred to hereinafter as a gap region of a second type). The gap regions of the first type are displayed in an inconspicuous color, and the gap regions of the second type are displayed in a conspicuous color. This produces effects to be described below.

The gap regions of the first type are unavoidable by any countermeasure because of the principle of measurement based on the detection of reference light reflected from an object. It is substantially useless to inform the user about the gap regions of the first type. On the other hand, the gap regions of the second type can fall within a measurable region and be rendered measurable by changing the position of the user (i.e., moving the user backwardly). For this reason, the gap regions of the second type are displayed in a conspicuous color to inform the user about the presence thereof. Moreover, the gap regions of the first type, which include a flat region such as eyes and eyebrows, are not so conspicuous if modified by interpolation. Therefore, the gap regions of the first type have a possibility of being recovered by interpolation, and there is no need to inform the user about the presence of the gap regions of the first type. On the other hand, the gap region of the second type, which exhibit considerable changes in inclination such as the tip of the nose, are formed into a visually unnatural shape if modified by interpolation. Therefore, there is a need to inform the user about the presence of the gap regions of the second type.

<4.4 Details of Complementary Data Producing Function F13>

Figure 23:
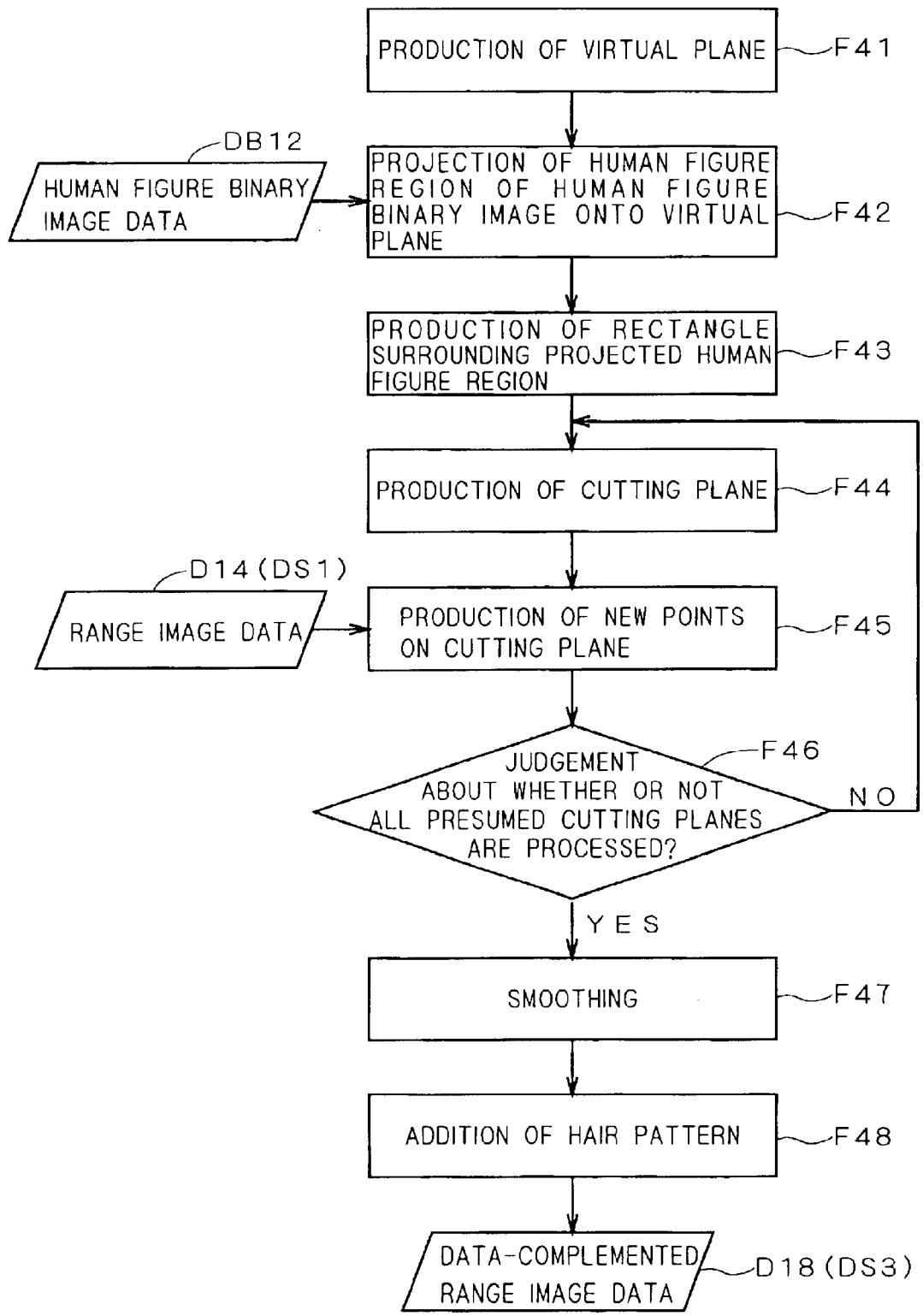
FIG. 23 is a functional block diagram of a complementary data producing function shown in FIG. 6.

FIG. 23 is a functional block diagram showing a plurality of functions constituting the complementary data producing function F13 together with data flows.

Figure 24:
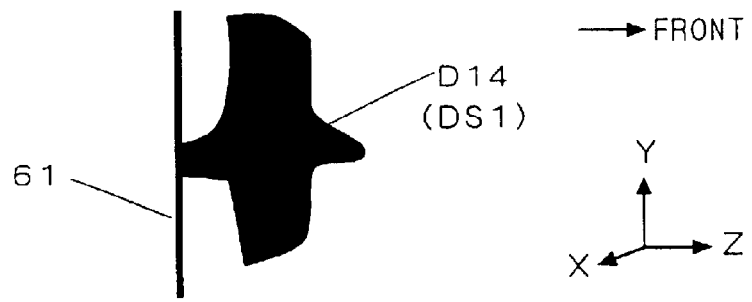
FIG. 24 shows a definition of a virtual plane.

With reference to FIG. 23, a function F41 produces a virtual plane in a three-dimensional space in which a range image is to be formed. Examples of the virtual plane contemplated herein include a virtual X-Y plane 61 presumed to be in contact with a pixel whose Z coordinate in the range image data D14 (corresponding to the range image data DS1 of FIG. 5) is minimum (or a rearmost pixel of the human figure) as shown in FIG. 24, and a virtual X-Y plane 61 spaced a predetermined offset distance apart from the pixel having the minimum Z coordinate in the Z direction.

A function F42 projects the human figure region defined by the human figure binary image data DB12 onto the virtual plane 61 produced by the function F41.

Figure 25A:
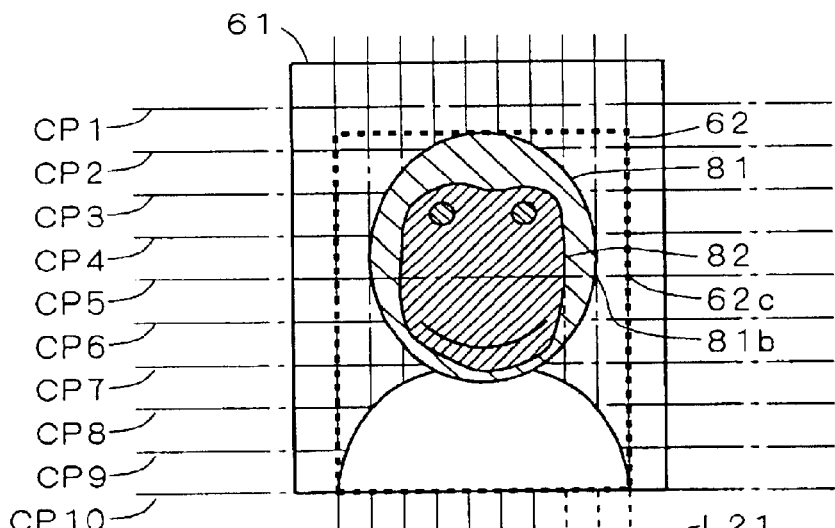
FIGS. 25A and 25B illustrate a complementary data producing process.

A function F43 calculates a region surrounding the human figure region projected onto the virtual plane by the function F42 to produce a human figure region rectangle. For example, a human figure region rectangle 62 is produced when a human figure region 81 is projected onto the virtual plane 61, as shown in FIG. 25A.

A function F44 sequentially produces a plurality of X-Z cutting planes for slicing the range image defined by the range image data D14 and the human figure region projected onto the virtual plane 61. For example, cutting planes CP1 to CP10 are sequentially produced as shown in FIG. 25A.

A function F45 receives the range image data D14 and slices the range image defined by the range image data D14 and the human figure region projected onto the virtual plane along the cutting planes produced by the function F44 to produce new complementary data.

The process of producing the new complementary data by the function F45 will be described in detail. As described with respect to the background art problems, the lack of the range image data D14 in the peripheral region causes the range image defined by the range image data D14 to be smaller in area than the human figure region. Thus, a range image 82 lies within the human figure region 81 in the X-Y plane as shown in FIG. 25A. Only a facial part of the range image is shown, with other parts omitted, in FIG. 25A (also in FIGS. 27B and 29A).

Figure 25B:
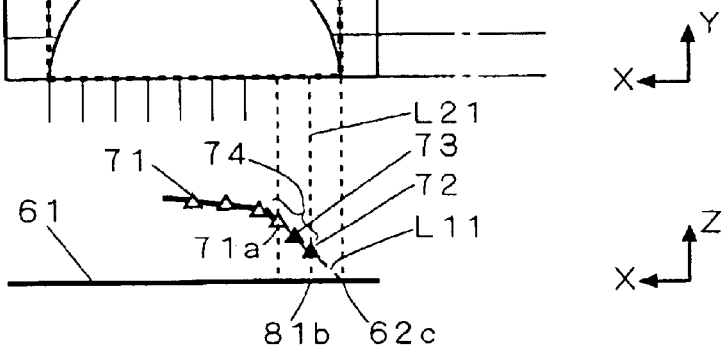

When the range image and the human figure region are sliced, for example, along the cutting plane CP5 as shown in FIG. 25B, pixels of the range image 82 which lie on the cutting plane CP5 are extracted as points of measurement 71. Then, a line which connects a point of measurement 71a which is an outermost one of the points of measurement 71 and a point 62c of the human figure region rectangle 62 which lie on the cutting plane CP5 is defined as a virtual extension L11.

A point of intersection of an additional line L21 drawn in the Z direction from an outermost point 81b of the human figure region 81 (or a point at the periphery of the human figure region 81) and the virtual extension L11 is defined as a reference point 72. The reference point 72 serves as a point which constitutes a presumed contour which is judged as a contour of a range image after the complementing process, and a region lying between the reference point 72 and the outermost point of measurement 71a serves as a no-data region 74 to which data is to be provided by the complementing process.

The data complementing process is performed by linear interpolation on the no-data region 74 lying between the reference point 72 and the outermost point of measurement 71a to produce an additional point 73.

In this manner, the function F45 produces the reference point 72 (i.e., a point for presumption of the contour of the range image after the complementing process) and the additional point 73 based on the reference point 72 in addition to the points of measurement 71 originally present on the cutting plane, thereby to perform the data complementing process upon the region in which the range image data D14 is lacking.

Alternatively, the no-data region may be defined between the outermost point of measurement 71a and the outermost point 81b of the human figure region 81 to produce an additional point. In this case, the range image defined by the range image data D14 subjected to the complementing process has a three-dimensional shape in contact with the virtual plane 61.

As described above, the functions F41 to F45 shown in FIG. 23 correspond to a function of recognizing the no-data region 74 and a function of performing the data complementing process on the no-data region 74.

A function F46 verifies whether or not the data complementing process by the function F45 is completed for all of the presumed cutting planes. If it is completed (YES), the function F46 passes the subsequent process to a function F47. If it is not completed (NO), the function F46 causes the function F44 to produce a new cutting plane image and to cause the function F45 to perform the data complementing process upon the new cutting plane.

The function F47 performs a smoothing process upon the data-complemented range image data D14 to remove jaggies of the range image.

A function F48 adds a hair pattern to a hair region (e.g., a region lying over the range image 82 (in the Y direction) and within the human figure region 81 in the instance of FIG. 25A and corresponding to a black region of the color image associated with the human figure region 81) of the range image defined by the range image data D14 subjected to the smoothing process by the function F47, to finally produce the data-complemented range image data D18 (corresponding to the range image data DS3 of FIG. 5). A method of adding the hair pattern is disclosed in, for example, Japanese Patent Application Laid-Open No. P09-358861A (1997).

As described above, the complementary data producing function in the 3-D shape data processing device 40 utilizes the human figure binary image data DB12 regarding the human figure region extracted from the color image data D11 to presume the contour of the range image after the complementing process. The complementary data producing function then performs the data complementing process on the no-data region (one line segment for one cutting plane) between the presumed contour and the periphery of the range image, to complement the range image data D14 using a relatively less laborious technique (linear interpolation or the like) without applying an equation of a curved plane or line, thereby producing the data-complemented range image data D18.

Therefore, the high-speed execution of such a simple data complementing process allows the 3-D shape data processing device 40 to be applied to the 3-D model product production apparatus 1 which is a vending machine that requires as quick a response as real-time response without a hitch. If the response is sufficiently quicker than the required response, the additional point 73 may be produced by curved plane or line interpolation after the production of the reference point 72.

When the range image data D14 is compressed in the Z direction to produce a 3-D shape model product sculptured in relief, a shape error in the Z direction is not so serious a problem. In such a case, therefore, the method of complementing the range image data D14 by the above-mentioned linear interpolation is a preferable technique capable of properly producing a 3-D shape model product at high speeds.

Additionally, the raw 3-D shape data inputted to the 3-D shape data processing device 40 is only one type of the range image data D14 (corresponding to the range image data DS1 of FIGS. 3 and 5). This prevents the increase in device manufacturing costs.

Further, the human figure binary image data DB12 which defines the human figure region is produced after the narrowing-down process of expanding the background region and removing the periphery of the preliminary human figure region on a pixel-by-pixel basis. This minimizes the likelihood that the background color is present in the color image associated with the human figure region to increase the precision of the human figure region defined by the human figure binary image data DB12 for processing the range image data D14, thereby increasing the data complementing precision of the above described complementary data producing function.

<5. First Variation of Complementary Data Producing Function F13>

The virtual plane 61 is defined at the rear of the range image (at which the Z coordinate of the virtual plane 61 is less than or equal to the minimum Z coordinate of the range image), with reference to FIGS. 24, 25A and 25B. However, the virtual plane 61 need not always be defined at the rear of the range image, but may be defined at the front of the range image. In this case, it is contemplated that the data complementing process by the function F45 employs a technique which does not depend on the Z coordinate of the virtual plane.

Figure 26:
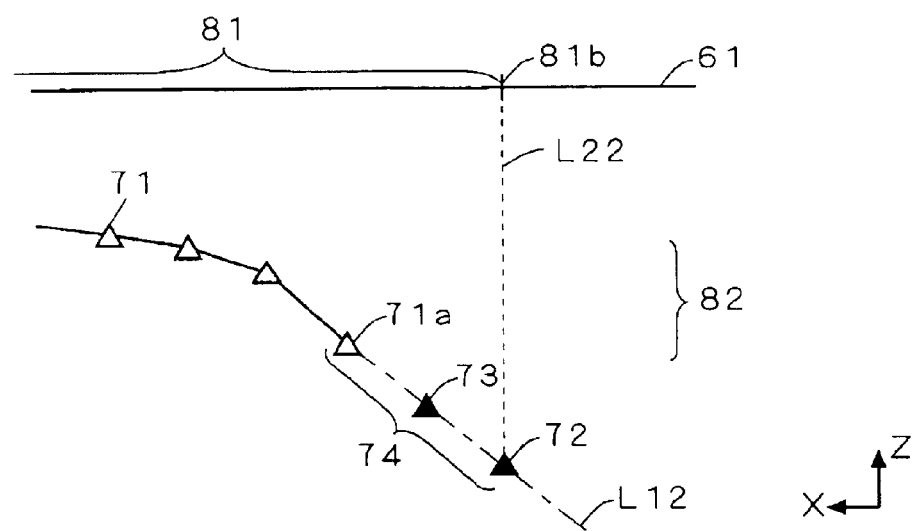
FIG. 26 illustrates a variation of the complementary data producing process.

As illustrated in FIG. 26, for instance, when the virtual plane 61 is defined at the front of the range image 82 and is sliced along a predetermined cutting plane, pixels of the range image 82 which lie on the cutting plane are extracted as the points of measurement 71. Based on the extracted points of measurement 71, a virtual extension L12 extended from the outermost point of measurement 71a is defined.

A point of intersection of an additional line L22 drawn in the Z direction from the outermost point 81b of the human figure region 81 on the virtual plane 61 and the virtual extension L12 is defined as the reference point 72 (i.e., a point for presumption of the contour of the range image after the complementing process). The linear interpolation is performed on the no-data region 74 lying between the reference point 72 and the outermost point of measurement 71a to produce the additional point 73.

In this manner, even if the virtual plane 61 is defined at the front of the range image 82, the function F45 can produce the reference point 72 and the additional point 73 in addition to the points of measurement 71 originally present on the cutting plane, thereby to complement the range image data D14.

In the technique shown in FIG. 26, the virtual plane 61 is defined for purposes of convenience to determine the reference point 72. The position of the virtual plane 61 exerts no influence upon the result of the complementing process of the range image data D14 after the reference point 72 is determined.

Although the above description is based on the precondition that the virtual plane 61 is present, the virtual plane 61 is defined for convenience in facilitating the understanding of the process of determining the no-data region and need not be present as a specific plane. For instance, the no-data region may be determined using the X and Y coordinates of a noteworthy position in the human figure binary image data DB12 and the X and Y coordinates of a noteworthy position in the range image data D14, in which case the concept of the virtual plane 61 is not required.

Thus, the virtual plane is defined for convenience in determining the no-data region and in performing the data complementing process. The determination of the no-data region and the data complementing process can be accomplished if the concept of the virtual plane is not used.

<6. Second Variation of Complementary Data Producing Function F13>

Figure 27A:
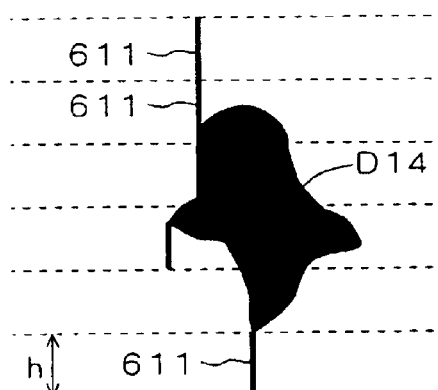
FIGS. 27A and 27B show a definition of partial virtual planes.
Figure 27B:
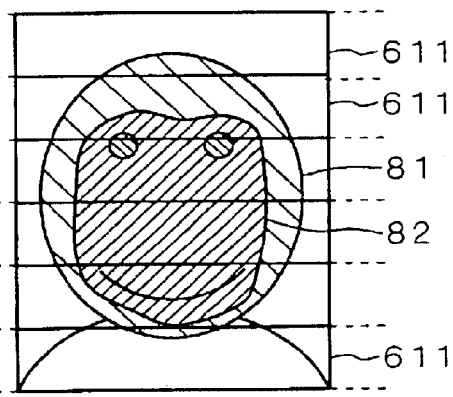
Figure 28:
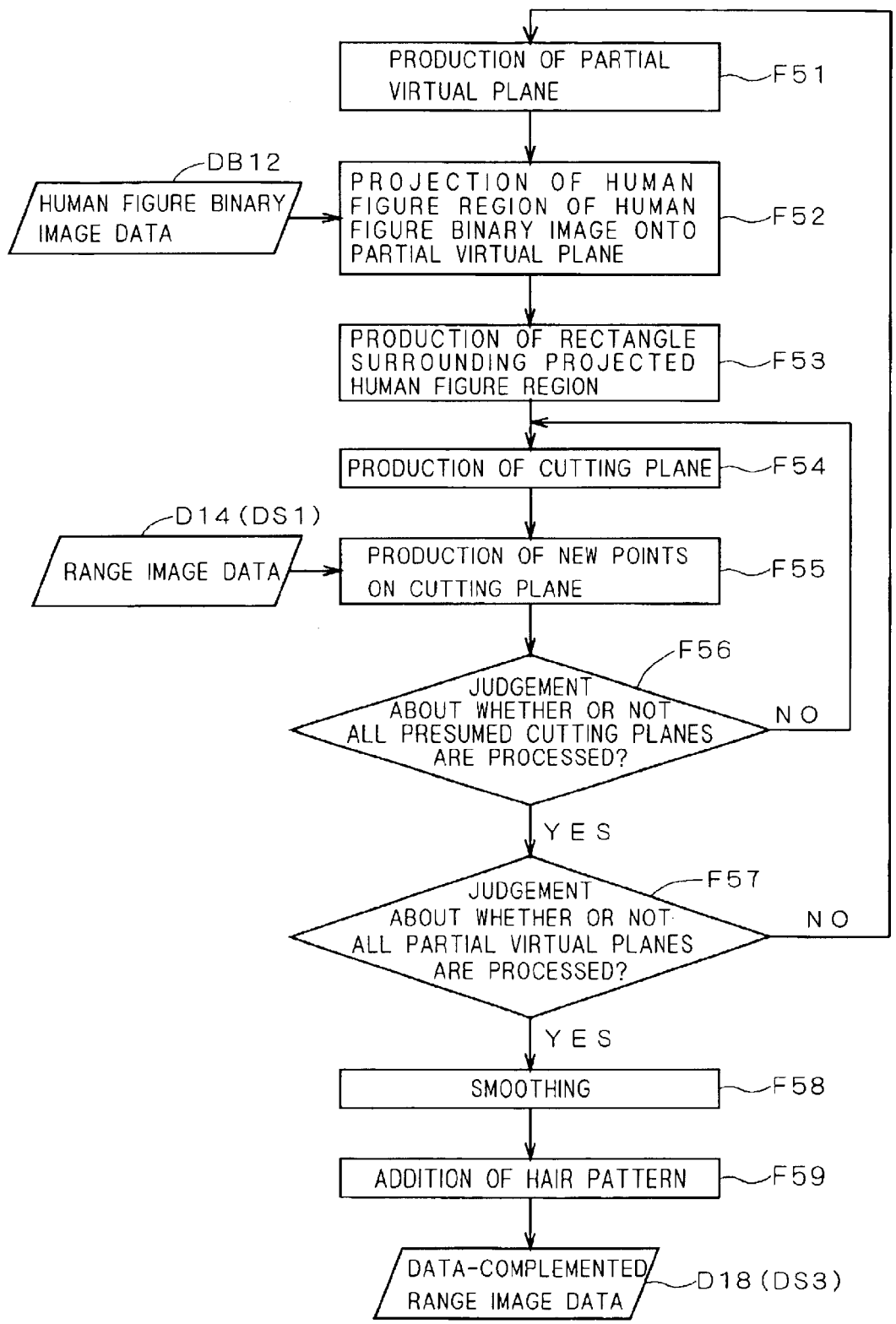
FIG. 28 is a functional block diagram of the complementary data producing function shown in FIG. 6 when the partial virtual planes are used.

The single virtual plane 61 is defined for production of the complementary data in the instance shown in FIG. 24. The present invention does not limit the number of virtual planes to one, but may define a plurality of virtual planes. FIGS. 27A and 27B show an example of a plurality of partial virtual planes 611 defined for production of the complementary data. FIG. 28 is a functional block diagram showing a plurality of functions constituting the complementary data producing function F13 (See FIG. 6) when the plurality of partial virtual planes 611 are defined.

A function F51 shown in FIG. 28 is operated first when producing the complementary data. The function F51 produces partial virtual planes in a three-dimensional space in which the range image is to be formed. For instance, the function F51 assumes the partial virtual planes 611 arranged in the Y direction in an X-Y plane and each having a height h, and places each of the partial virtual planes 611 in a Z-coordinate position at which it is in contact with a pixel having a minimum Z coordinate in its associated partial region in the range image data D14 or in a position spaced a predetermined offset distance apart from the above-mentioned Z-coordinate position in the Z direction, as shown in FIG. 27A. Specifically, each of the partial virtual planes 611 is defined based on a position farthest from a reference point of measurement in its associated partial region in the range image data D14. The reference characters 81 and 82 in FIG. 27B denote regions corresponding to the human figure region 81 and the range image 82 of FIG. 25A, respectively.

When a partial virtual plane 611, such as a topmost partial virtual plane 611 illustrated in FIGS. 27A and 27B, has no associated partial region in the range image data D14, the partial virtual plane 611 is defined using the Z-coordinate position of its adjacent partial virtual plane 611.

After the function F51 produces one partial virtual plane 611, functions F52 to F56 similar in operation to the functions F42 to F46 shown in FIG. 23 produce the complementary data for this partial virtual plane 611.

Figure 29A:
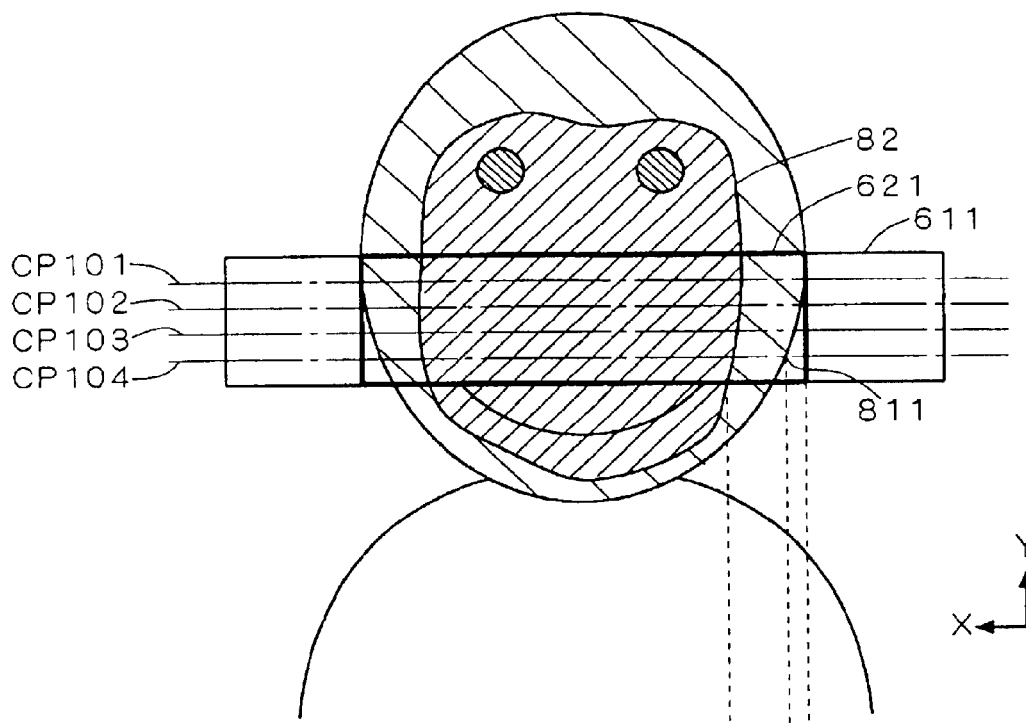
FIGS. 29A and 29B illustrate the complementary data producing process when the partial virtual planes are used.

More specifically, the function F52 projects the human figure region defined by the human figure binary image data DB12 onto the partial virtual plane 611 produced by the function F51. The function F53 calculates a region surrounding the projected human figure region to produce a human figure region rectangle. For example, a human figure region rectangle 621 is produced when a human figure region 811 is projected onto the partial virtual plane 611, as shown in FIG. 29A. The function F54 produces a plurality of X-Z cutting planes CP101 to CP104, as shown in FIG. 29A.

Figure 29B:
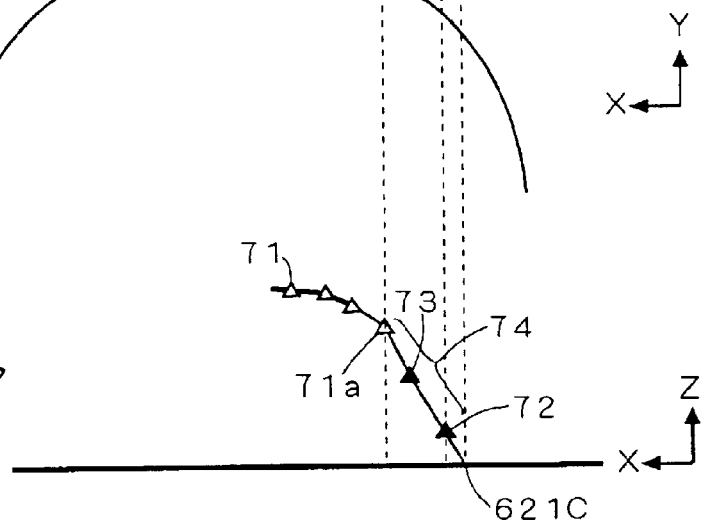

The function F55 receives the range image data D14 and slices the range image defined by the range image data D14 and the human figure region projected onto the partial virtual plane 611 along the cutting planes to produce new complementary data. Specifically, when the range image and the human figure region are sliced, for example, along the cutting plane CP103 as shown in FIG. 29B, pixels of the range image 82 which lie on the cutting plane CP103 are extracted as points of measurement 71. Then, a line connects a point of measurement 71a which is an outermost one of the points of measurement 71 and a point 621c of the human figure region rectangle 621 which lie on the cutting plane CP103. The reference point 72 is defined at a position lying on this line and corresponding to the boundary of the human figure region 811. The additional point 73 is produced with suitable spacings between the reference point 72 and the point of measurement 71a.

The reference point 72 serves as a point which constitutes a presumed contour which is judged as a contour of a range image after the complementing process, and a region lying between the reference point 72 and the outermost point of measurement 71a serves as the no-data region 74 to be subjected to the complementing process.

The function F56 causes the functions F51 to F55 to perform the above described processes upon all of the presumed cutting planes. This completes the process of producing the complementary data for the single partial virtual plane 611. Subsequently, a function F57 causes the process of producing the complementary data to be performed upon all of the partial virtual planes 611, thereby producing the complementary data throughout the range image data D14. This adds the reference point 72 and the additional point 73 which are newly produced to the points of measurement 71 of the original range image data D14 to provide the complemented range image data D14. In other words, the functions F51 to F57 correspond to the functions of recognizing the no-data regions for all of the partial virtual planes and the functions of performing the data complementing process for all of the partial virtual planes.

Thereafter, a function F58 similar in operation to the function F47 shown in FIG. 23 performs a smoothing process upon the range image defined by the data-complemented range image data D14 by using the moving average method or the like. A function F59 adds a hair pattern to the range image to finally produce a data-complemented range image.

Figure 30:
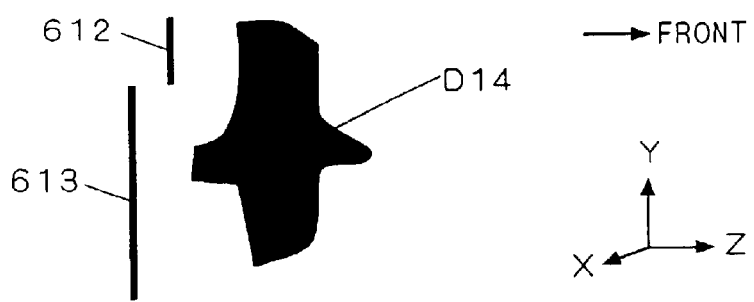
FIG. 30 illustrates another definition of the partial virtual planes.

The partial virtual planes 611 are not limited to those of a strip-like configuration extending in the X direction, but may be of any configuration. For example, partial virtual planes extending in the Y direction may be defined for an upper head part of the human figure, and cutting planes parallel to a Y-Z plane may be produced. Furthermore, as shown in FIG. 30, a partial virtual plane 612 and a partial virtual plane 613 may be defined for a hair region of the face and a skin region thereof, respectively.

In this manner, the partial virtual planes may be defined in accordance with the characteristics of the range image and the color image.

As described above, the complementary data producing function shown in FIG. 28 can also easily determine the no-data region from the human figure region of the color image data and the range image data, and complement the range image data as easily and precisely as the complementary data producing function shown in FIG. 23.

The provision of the plurality of partial virtual planes allows the definition of the partial virtual planes in accordance with the shape of the range image indicated by the range image data D14 and the characteristics of the color image and the range image, accomplishing the determination of the no-data region and the data complementing process more suitably.

In the above description, the no-data region is determined by projecting the human figure binary image onto the partial virtual plane. When perspective projection is used as a projecting technique, variations in distance between the range image and the virtual plane influence the size of the human figure region on the virtual plane. In such a case, the definition of the plurality of partial virtual planes in accordance with the shape of the range image allows the proper recognition of the no-data region.

Moreover, if the additional point 73 to be produced for the complementing process is dependent upon the position of the virtual plane in the data complementing process after the determination of the no-data region (e.g., if the complementing technique shown in FIG. 29B is used), the definition of the plurality of partial virtual planes in accordance with the shape of the range image allows the suitable data complementing process with slight errors.

<7. Modifications>

While the preferred embodiment of the present invention is described hereinabove, the present invention is not limited to the above preferred embodiment but may be variously modified.

For instance, the virtual plane 61 and the partial virtual planes 611 are defined in imaginary fashion in the above preferred embodiment. The virtual plane to be defined is not limited to a straight plane but may be a curved plane. More specifically, a virtual curved plane 614 may be defined along the periphery of the range image of the face (or spaced a predetermined offset distance from the periphery) as shown in FIG. 31 in place of the virtual plane 61 shown in FIG. 24. Then, the human figure region is projected onto the virtual curved plane 614, and the points on the cutting plane are added for the data complementing process of the range image data D14.

Likewise, partial virtual planes 615 to 617 including a curved plane as shown in FIG. 32 may be used in place of the partial virtual planes 611 to 613 shown in FIGS. 27A and 30. In the instance shown in FIG. 32, a cylindrical surface extending in the X-direction is used as the partial virtual plane 616 to facilitate the data complementing process. Thus, the use of a curved plane as the virtual plane permits the virtual plane to conform to the shape of the range image, accomplishing the complementing process more precisely.

Further, the human figure region is extracted from the 2-D color image data D11 by using the statistical background screen color data D12 and the Mahalanobis distance data D13 in the above preferred embodiment (by the function F11 as shown in FIG. 6). The original 2-D image data is not limited to color image data but may be monochrome image data. In this case, a region serving as the background may be extracted depending on whether or not the spatial frequency of each small region in the image falls within a background-determining spatial frequency range. Consequently, the human figure binary image data DB12 is produced.

Although the plurality of functions of the 3-D shape data processing device 40 are mainly discussed in the above preferred embodiment, these functions may be constructed as purpose-built electric circuits. Alternatively, all or some of the functions may be constructed as a general computer system.

The present invention may be embodied by either a computer system controlled in accordance with software programs or a hardware system having individual hardware elements for conducting the respective steps as described in the preferred embodiments. Both of the software elements and the hardware elements are included in the terminology of "means" which are elements of the system according to the present invention.

While the invention has been described in detail, the foregoing description is in all aspects illustrative and not restrictive. It is understood that numerous other modifications and variations can be devised without departing from the scope of the invention.

What is claimed is:

1. A device for processing three-dimensional data, said device outputting desired three-dimensional data about an object based on two-dimensional image data about said object and three-dimensional range image data including range information regarding distances from a reference point for measurement to points of measurement on said object, said two-dimensional image data and said range image data being associated with each other, said device comprising:

means for extracting an object region from a two-dimensional image defined by said two-dimensional image data, based on a predetermined criterion;

means for recognizing a no-data region, based on a range image defined by said range image data and said object region; and means for performing a data complementing process by providing data to no-data part of said range image data in said no-data region to produce complemented range image data defining a complemented range image.

2. The device according to claim 1, wherein said means for recognizing said no-data region comprises:

means for defining a virtual plane in corresponding relation to said range image;

means for projecting said object region onto said virtual plane; and means for presuming a contour of said complemented range image to provide a presumed contour, based on said object region projected onto said virtual plane and said range image, and then recognizing a region lying between said presumed contour and a periphery of said range image as said no-data region.

3. The device according to claim 1, wherein said means for recognizing said no-data region comprises:

means for defining a plurality of partial virtual planes in corresponding relation to a plurality of partial regions of said range image;

means for projecting said object region onto said plurality of partial virtual planes; and means for presuming a contour of said complemented range image to provide a presumed contour, based on said object region projected onto said plurality of partial virtual planes and said plurality of partial regions of said range image, and then recognizing a region lying between said presumed contour and a periphery of said range image as said no-data region.

4. The device according to claim 3, wherein said means for defining said plurality of partial virtual planes defines each of said plurality of partial virtual planes, based on a position farthest from said reference point of measurement in its associated one of said plurality of partial regions.

5. The device according to claim 3, wherein said data complementing process is performed in accordance with a position in which each of said plurality of partial virtual planes is defined.

6. The device according to claim 1, wherein said means for extracting said object region discriminates between a preliminary object region and a background region in said two-dimensional image, based on predetermined background reference data, and thereafter removes a periphery of said preliminary object region to extract said object region.

7. A device for processing three-dimensional data, said device outputting desired three-dimensional data about an object based on two-dimensional image data about said object and three-dimensional range image data including range information regarding distances from a reference point for measurement to points of measurement on said object, said two-dimensional image data and said range image data being associated with each other, said device comprising:

means for discriminating between a preliminary object region and a background region in a two-dimensional image defined by said two-dimensional image data, based on a predetermined criterion; and means for removing a periphery of said preliminary object region to provide an object region, wherein said means for removing a periphery of said preliminary object region to provide an object region applies a predetermined background color over other than said object region in said two-dimensional image to provide a display image.

8. A method of processing three-dimensional data to produce desired three-dimensional data about an object based on two-dimensional image data about said object and three-dimensional range image data including range information regarding distances from a reference point for measurement to points of measurement on said object, said two-dimensional image data and said range image data being associated with each other, said method comprising the steps of:

extracting an object region from a two-dimensional image defined by said two-dimensional image data, based on a predetermined criterion;

recognizing a no-data region, based on a range image defined by said range image data and said object region; and performing a data complementing process by providing data to no-data part of said range image data in said no-data region to produce complemented range image data defining a complemented range image.

9. The method according to claim 8, wherein said step of recognizing said no-data region comprises the steps of:

defining a virtual plane in corresponding relation to said range image;

projecting said object region onto said virtual plane; and presuming a contour of said complemented range image to provide a presumed contour, based on said object region projected onto said virtual plane and said range image, and then recognizing a region lying between said presumed contour and a periphery of said range image as said no-data region.

10. The method according to claim 8, wherein said step of recognizing said no-data region comprises the steps of:

defining a plurality of partial virtual planes in corresponding relation to a plurality of partial regions of said range image;

projecting said object region onto said plurality of partial virtual planes; and presuming a contour of said complemented range image to provide a presumed contour, based on said object region projected onto said plurality of partial virtual planes and said plurality of partial regions of said range image, and then recognizing a region lying between said presumed contour and a periphery of said range image as said no-data region.

11. The method according to claim 10, wherein said step of defining said plurality of partial virtual planes comprises the step of defining each of said plurality of partial virtual planes, based on a position farthest from said reference point of measurement in its associated one of said plurality of partial regions.

12. The method according to claim 10, wherein said data complementing process is performed in accordance with a position in which each of said plurality of partial virtual planes is defined.

13. The method according to claim 8, wherein said step of extracting said object region comprises the step of discriminating between a preliminary object region and a background region in said two-dimensional image, based on predetermined background reference data, and thereafter removing a periphery of said preliminary object region to extract said object region.

14. A method of processing three-dimensional data to produce desired three-dimensional data about an object based on two-dimensional image data about said object and three-dimensional range image data including range information regarding distances from a reference point for measurement to points of measurement on said object, said two-dimensional image data and said range image data being associated with each other, said method comprising the steps of:

discriminating between a preliminary object region and a background region in a two-dimensional image defined by said two-dimensional image data, based on a predetermined criterion; and removing a periphery of said preliminary object region to provide an object region, wherein said step of removing a periphery of said preliminary object region to provide an object region comprises the step of applying a predetermined background color over other than said object region in said two-dimensional image to provide a display image.

* * * * *